United States Patent

Hansen

[11] Patent Number: 5,819,042
[45] Date of Patent: Oct. 6, 1998

[54] METHOD AND APPARATUS FOR GUIDED CONFIGURATION OF UNCONFIGURED NETWORK AND INTERNETWORK DEVICES

[75] Inventor: Peter A. Hansen, Houston, Tex.

[73] Assignee: Compaq Computer Corporation, Houston, Tex.

[21] Appl. No.: 603,061

[22] Filed: Feb. 20, 1996

[51] Int. Cl.[6] .................................................. G06F 13/00
[52] U.S. Cl. ................................ 395/200.52; 395/200.53
[58] Field of Search ........................... 395/200.5, 200.51, 395/200.52, 200.58, 701, 702, 703, 326, 200.53

[56] References Cited

U.S. PATENT DOCUMENTS

| | | | |
|---|---|---|---|
| 4,864,492 | 9/1989 | Blakey-Fogel et al. | 395/200.5 |
| 5,257,387 | 10/1993 | Richek et al. . | |
| 5,261,044 | 11/1993 | Dev et al. | 395/159 |
| 5,353,401 | 10/1994 | Iizawa et al. . | |
| 5,353,432 | 10/1994 | Richek et al. . | |
| 5,394,522 | 2/1995 | Sanchez-Frank et al. | 395/159 |
| 5,438,528 | 8/1995 | Emerson et al. . | |
| 5,452,415 | 9/1995 | Hotka | 395/200.5 |
| 5,491,796 | 2/1996 | Wanderer et al. | 395/200.09 |
| 5,500,934 | 3/1996 | Austin et al. | 395/755 |

FOREIGN PATENT DOCUMENTS

| | | | |
|---|---|---|---|
| 490 624 A2 | 6/1992 | European Pat. Off. | G06F 15/16 |
| 2 206 713 | 1/1989 | United Kingdom | G06F 15/60 |
| 2 278 468 | 11/1994 | United Kingdom | G06F 9/445 |
| WO 94/10645 | 5/1994 | WIPO | G06F 15/62 |

OTHER PUBLICATIONS

"Architecture for Graphic Network Install Interface," IBM Technical Disclosure Bulletin, vol. 38, No. 10, Oct. 1995, pp. 465–467, Armonk, NY, USA.
"HP Router Manager—Getting Started Guide", Hewlett Packard Company (Publication 5963–2620), Mar. 1995.
Ciscoworks for Windows Features (version 2.0), Dec. 1994.
Managing Cisco Device Configurations (Ciscoworks 2.0), Sep. 1994.

*Primary Examiner*—Frank J. Asta
*Assistant Examiner*—Matthew Kaminer
*Attorney, Agent, or Firm*—Beyer & Weaver, LLP

[57] ABSTRACT

Computer-implemented method and apparatus and associated for constructing a network configuration map comprised of at least two interconnected network entities selected from a series of network entities. A series of configuration scripts, each corresponding to one of the series of network entities include a first section comprised of a first portion containing an icon file for generating an icon representative of the corresponding one of the series of network entities, a second portion containing a set of connection rules for the corresponding one of the series of network entities and a second section containing a series of executable instructions for constructing a configuration file for the network entity. A first software module constructs the network configuration map by generating a workspace, placing first and second icons on the workspace in response to a first input received from a user interface and connecting the icons if the set of connection rules contained in the second portion of the corresponding configuration scripts permit connection therebetween. A second software module then executes the series of instructions contained in the second section of the configuration script to construct a configuration file, suitable for upload to the network device to enable configuration thereof, for a selected one of the connected icons.

24 Claims, 12 Drawing Sheets

METHOD AND APPARATUS FOR GUIDED CONFIGURATION OF UNCONFIGURED NETWORK AND INTERNETWORK DEVICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This application is related to co-pending U.S. patent application Ser. No. 08/603,062, filed on even date herewith, entitled "CONFIGURATION MANAGER FOR NETWORK DEVICES AND AN ASSOCIATED METHOD FOR PROVIDING CONFIGURATION INFORMATION THERETO", assigned to the Assignee of the present application and hereby incorporated by reference as if reproduced in its entirety.

BACKGROUND OF THE INVENTION

1. Field of the Invention

This application generally relates to computer networks and internetworks and, more particularly, to a software tool which configures devices to be included in a computer network or internetwork.

2. Description of Related Art

Generally speaking, a network is a collection of user devices, generally classified as data terminal equipment (or "DTE"), interconnected for bi-directional exchanges of information. For example, visual displays, computer systems and office workstations are all electronic devices classified as DTEs. A local area network (or "LAN") is an interconnection of plural computer systems distributed around a single site. A wide area network (or "WAN") is an interconnection of plural computer systems located at different sites. Traditionally, computer systems have used modems to connect to a WAN via the public switched telephone network (or "PSTN") or public switched data network (or "PSDN"). In recent years, WANs which utilize integrated services digital networks (or "ISDNs"), which enable data to be transmitted without modems, to interconnect computer systems have become more common. Finally, an internetwork is a collection of networks interconnected by a WAN.

Devices are initially unconfigured when delivered by the factory. Configuration is a process during which the hardware and software of an unconfigured device is organized and interconnected so that the configured device will be able to perform the tasks desired thereof. As is well appreciated in the art, the wide variety of devices which may be installed on a network, as well as the variety of networks which may be connected to form an internetwork, makes the configuration of networks and internetworks a difficult task which requires highly detailed technical knowledge of the various networks, the protocols used to link with the various networks and the devices to be installed thereon. Thus, configuration of network devices is often one of the most daunting tasks facing a network administrator, particularly for those in charge of small and medium size networks have between 100 and 1,000 nodes. While such networks are relatively complex, their administrators often have only minimal training in internetworking administration and may be unfamiliar with routing technology and/or WAN technology.

For example, data link protocols are used to control access to networks. A LAN typically uses the logical link control (or "LLC") subclass of the high-level data link control (or "HDLC") protocol as its data link protocol. However, an X.25-type packet-switching WAN uses link access procedure, balanced (or "LAPB"), a protocol based on HDLC, as its data link protocol. The data link protocol for an ISDN-type WAN, on the other hand, may either be a connection-orientated protocol known as frame switching or a connectionless protocol known as frame relay.

Thus, it can be readily seen from the foregoing that: it would be desirable to simplify the task of configuring network devices. It is, therefore, the object of this invention to provide an apparatus and associated method for guiding a user through the complex task of configuring a network device.

SUMMARY OF THE INVENTION

In one embodiment, the present invention is of an apparatus and associated method, implemented on a computer system, for constructing a configuration file for a network device. The apparatus includes a configuration script stored in a memory subsystem of the computer system and a software module executable by a processor subsystem of the computer system. The configuration script contains a series of executable instructions for constructing a configuration file for a first specified type of network device. By executing the instructions contained in the configuration script, the software module may construct a configuration file suitable for upload to a network device of the first specified type for configuration such that the network device may be configured using the configuration file constructed by the software module.

In one aspect of this embodiment of the invention, the configuration script includes a first section which contains a series of configuration commands which generate requests for information such that information received by the software module in response to the requests for information is used to construct the configuration file. In another aspect of this embodiment of the invention, the configuration script includes a second section which contains a set of connection rules for connecting the first specified type of network device to at least one other specified type of network device. In a related aspect thereof, the first section includes a first portion which corresponds to each of the at least one other specified type of network device specified in the connection rules contained in the second section of the configuration script. Each such portion contains a subset of the series of configuration commands contained in the first section of the configuration script. Each such subset of configuration commands are executed only if the network device for which the configuration file is being constructed is connected to a network device of the other specified type of network device.

In another aspect thereof, the configuration script further includes a third section which defines a backplane bitmap for the network device. In a related aspect thereof, the third section of the configuration script further includes first, second and third portions. The first portion defines a bitmap file for generating the backplane bitmap, the second portion provides locational information for connected interfaces on the backplane bitmap and the third portion defines an overlay bitmap for the backplane bitmap for each of the at least one other specified type of network device specified in the connection rules contained in the second section of the configuration script. In another related aspect thereof, the configuration script further includes a fourth section which contains a user selectable set of commands for each of the connected interfaces.

In another embodiment, the present invention is of an apparatus and associated method, implemented on a computer system, for constructing a network configuration map comprised of at least two interconnected network entities selected from a series of network entities. The apparatus includes a series of configuration scripts, each corresponding to one of the series of network entities, stored in the memory subsystem and a first software module, executable by the processor subsystem. Each one of the series of configuration scripts includes a first section comprised of first and second portions. The first portion contains an icon file for generating an icon representative of the corresponding one of the series of network entities while the second portion contains a set of connection rules for the corresponding one of the series of network entities. The software module constructs the network configuration map by generating a workspace, placing at least two icons on the workspace in response to a first input received from a user interface and connecting first and second ones of the icons placed on the workspace in response to a second input received from the user interface if the set of connection rules contained in the second portion of the configuration scripts corresponding to first and second network entities represented by the first and second icons permit connection of the first and second network entities.

In one aspect of this embodiment of the invention, at least one of the series of configuration scripts further includes a second section which contains a series of executable instructions for constructing a configuration file for the network entity. In this aspect, the apparatus further comprises a second software module, executable by the processor subsystem in response to a third input received from the user interface which selects an icon previously placed on the network configuration map for configuration, for constructing a configuration file if the configuration script corresponding to the selected icon is one of the configuration scripts having the second section. The configuration file is constructed by executing the series of instructions contained in the second section of the configuration script and appending the constructed configuration file to the selected icon. In a further aspect thereof, the series of instructions contained in the second section of the configuration scripts includes a series of configuration commands which generate requests for information such that information received by the second software module in response to the requests for information is used to construct the configuration file.

In another aspect thereof, the second section of the configuration scripts further include a first portion corresponding to each one of the series of network entities specified in the set of connection rules contained in the first portion of the first section of the configuration script. This portion contains a subset of the series of configuration commands which are executed only if the network entity for which the configuration file is being constructed is connected to a network entity specified in the set of connection rules. In yet another aspect thereof, the first section of the configuration scripts further include a third portion which contains a name for the corresponding one of the series of network entities. During construction of the network configuration map, the first software module places the name on the network configuration map if the icon corresponding to the configuration script is placed on the map.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1A:
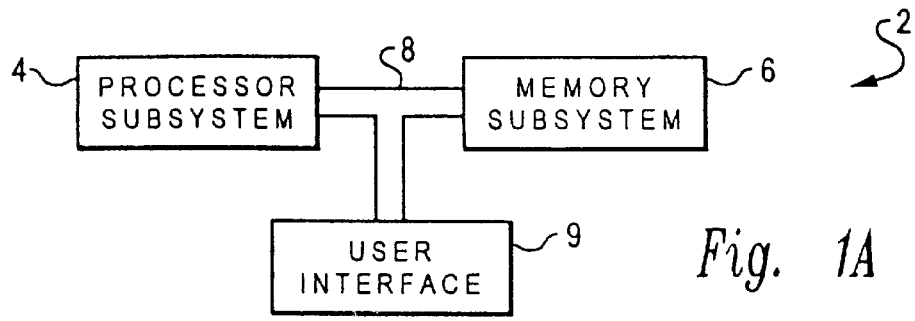
FIG. 1A is a simplified block diagram of a computer system on which a network device configuration tool may be installed.

Referring first to FIG. 1A, a computer system 2 suitable for installing a network device configuration tool thereon may now be seen. The computer system 2 is comprised of a processor subsystem 4, for example, a type P6 Pentium processor manufactured by Intel Corporation of Santa Clara, Calif., coupled to a memory subsystem 6, for example, a hard drive or other auxiliary memory device capable of storing large amounts of data infrequently used by the processor subsystem 4, by a system bus 8, preferably, a 32-bit wide peripheral connection interface (or "PCI") bus. Also coupled to the system bus 8 is a user interface 9. Commonly, the user interface is comprised of three peripheral devices—a video display, a keyboard and a pointing device.

Figure 1B:
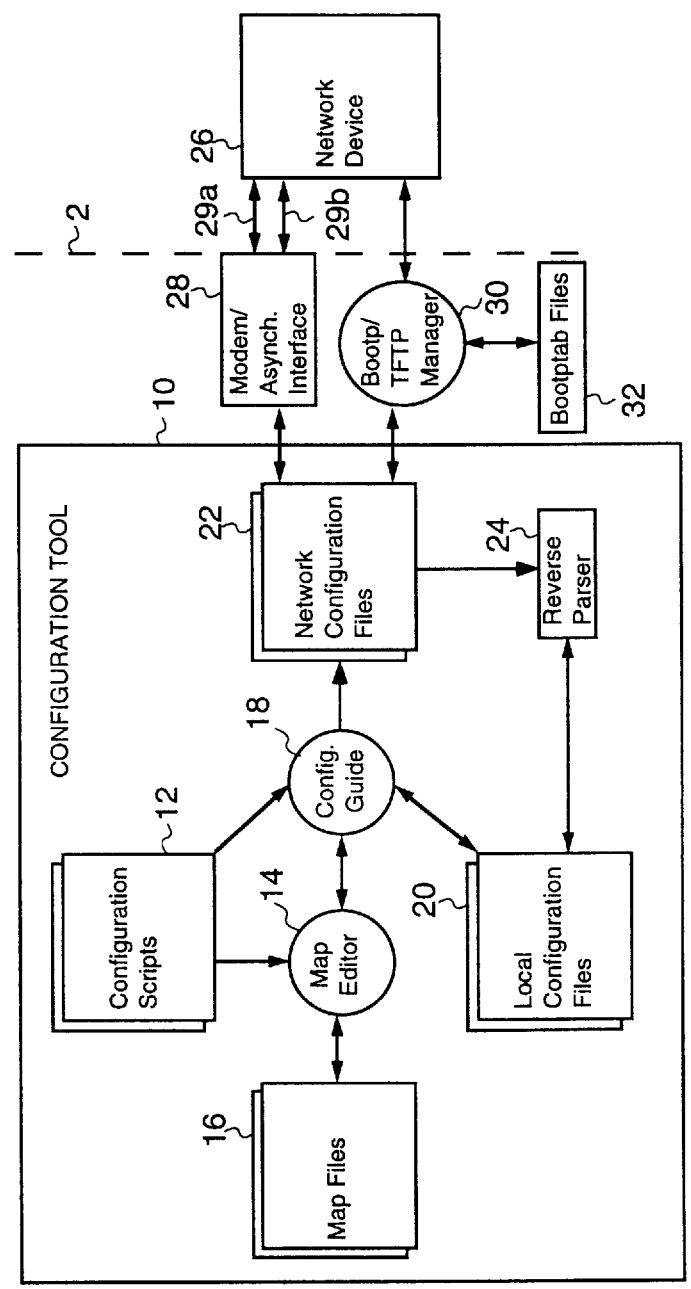
FIG. 1B is a block diagram of a network device configuration tool constructed in accordance with the teachings of the present invention.

Referring now to FIG. 1B, a network device configuration tool 10 constructed in accordance with the teachings of the present invention will now be described in greater detail. The network device configuration tool 10 is graphical user interface (or "GUI") based software launchable from a suitable platform installed on the computer system 2. For example, Windows 95 and Windows NT 3.51, both manufactured by Microsoft of Redmond, Wash., are suitable platforms from which the network device configuration tool 10 may be launched.

In its broadest sense, the network device configuration tool 10 provides a GUI in which the so-called "drag and drop" process is used to construct a network configuration map comprised of a series of interconnected network devices and/or network entities, for example, a LAN, WAN or other network, from a combination of user inputs, network configuration maps, configuration scripts and local configuration files.

In constructing the network configuration map, a series of local configuration files are constructed for the network devices and appended to the network configuration map. The local configuration files contain information, for example, internet protocol (or "IP") address, default gateway, router name and simplified network management protocol (or "SNMP") community strings, necessary for the network device, for example, a router, to properly communicate on the network.

For each network device for which a local configuration file has been constructed, the network device configuration tool 10 may also construct a network device configuration file suitable for export to the network device itself. In this manner, remote configuration of network devices is enabled.

As shown in FIG. 1B, the network device configuration tool 10 may be representatively illustrated as being comprised of two software modules, map editor 14 and configuration guide 18, both of which are executable by the processor subsystem 4, which retrieve data and programming instructions from various locations within the memory subsystem 8 of the computer system 2 on which the network device configuration tool 10 is installed.

The data and programming instruction are stored in the memory subsystem 6 as a series of files which may be selectively accessed by the map editor 14 and/or the configuration guide 18. Files which are accessible to the map editor 14 and/or the configuration guide 18 are configuration scripts 12, map files 16, local configuration files 20 and network configuration files 22. The configuration scripts 12 identify the types of network devices and network entities which may be placed on the network configuration map and interconnected with other network entities and network devices. The configuration scripts 12 also identify the network devices which are configurable by the network device configuration tool 10 and contain information necessary to construct configuration files for those network devices. If a particular network device does not have a configuration script, a configuration file cannot be constructed by the network device configuration tool 10. The map files 16 contain a series of network configuration maps, each comprised of a series of interconnected network devices and network entities, constructed using the network device configuration tool 10. The local configuration files 20 contain information which, if uploaded to the corresponding network device 26, would enable configuration of that device. If local configuration files 20 are constructed for the network devices illustrated on the network configuration map(s) 16 produced using the network device configuration tool 10, such local configuration files 20 are associated with the corresponding network device such that they may be directly accessed from the network configuration maps 16.

The network configuration files 22 are similar in content to the local configuration files 20 except that the files have been formatted for upload to a network device 26 coupled to the configuration tool in a manner to be more fully described below. Broadly speaking, a local configuration file 20 is modified for upload to the corresponding network device 26 by formatting the local file into the appropriate IP address for the target network device 26. Finally, the network device configuration tool 10 includes a reverse parser 24 coupled to the local configuration files 20 and the network configuration files 22. The reverse parser 24 is used to construct a local configuration file 20 from a network configuration file 22 downloaded to the network configuration tool 10 by the network device 26.

It is contemplated that the network device configuration tool 10 would be installed in the computer system 2 operated by a network administrator and that plural network devices 26 and other network entities, only one of which is shown in FIG. 1B for ease of illustration, would be coupled to the network device configuration tool 10. Utilizing the network device configuration tool 10, the network administrator may build a representative network configuration map for the network. The network administrator may then configure remotely located network devices by uploading configuration files constructed during the process of building the network configuration map to the devices. Thus, by using the network configuration tool, the network administrator can, from a central location, design a suitable configuration network and then configure any number of remotely located devices included in the network.

The network device configuration tool 10 is coupled to the network device 26 by an asynchronous interface 28 and a boot protocol (or "bootp")/trivial file transfer protocol (or "TFTP") manager 30. Under the control of an asynchronous manager (not shown), a software process within the processor subsystem 4, the asynchronous interface 28 is used to exchange configuration information, for example, a network configuration file 20, by either an in-band transfer via in-band connection 29a, for example, via telnet, or by an out-of-band transfer via out-of-band connection 29b, for example, via modem. Additionally, the bootp/TFTP manager 30, another software process within the processor subsystem 4, controls the exchange of bootp and TFTP messages between the network device configuration tool 10 and the network device 26. Generally, a bootp exchange is used to transfer raw address and other basic information so that a TFTP exchange may then be used to transfer configuration information. The bootp/TFTP manager 30 also controls accesses to bootptab files 32.

Figure 2A:
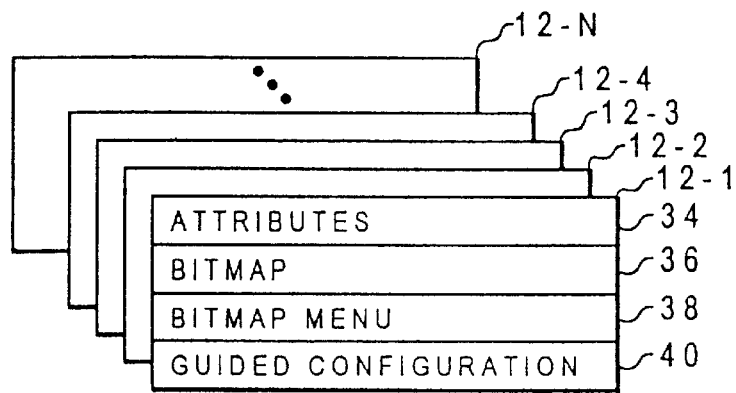
FIG. 2A is a block diagram of a configuration scripts portion of the network device configuration tool of FIG. 1.

As will be more fully described with respect to FIG. 3, below, the configuration scripts 12 are used to direct map editor 14 and configuration guide 18 in a guided configuration of a selected network device 26 by guiding in the construction of a configuration file for the device. Accordingly, turning momentarily to FIG. 2A, the configuration scripts 12 used to guide the configuration of a selected network device 26 will now be described in greater detail. As may now be seen, the configuration scripts 12 are comprised of a series of separate scripts 12-1 through 12-N, one for each type of device which may configured by the configuration tool 12. Each script 12-1 through 12-N is comprised of an attributes section 34, a bitmap section 36, a bitmap menu section 38 and a guided configuration section 40. Each of these sections 34, 36, 38 and 40 is a selectively executable set of commands which may be used during configuration of a device of the type corresponding to a particular script 12-1 through 12-N.

Figure 2B:
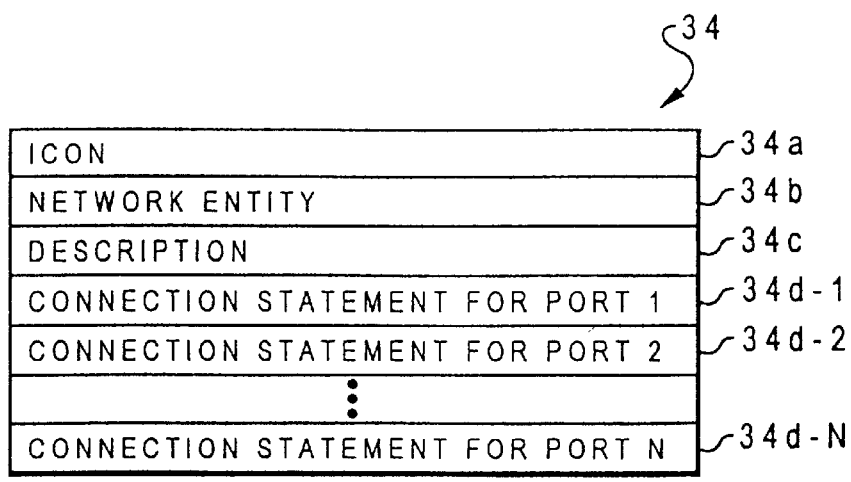
FIG. 2B is an expanded block diagram of an attributes section of a configuration script of FIG. 2A.

Turning now to FIG. 2B, the attributes section 34 is comprised of an icon portion 34a, a network entity portion 34b, a description portion 34c and a series of connection portions 34d-1 through 34d-N. A valid icon filename identifying the graphical icon to be associated with the device type corresponding to the configuration script 12-N is contained in the icon portion 34a. As will be more fully described below, this icon will appear in a device window of a configuration GUI and can be dragged onto a network workspace to add a device of that type to a network configuration map. The network entity portion 34b provides a unique name for the type of device and appears in the device window under the icon. The description portion 34c defines a default description for the device which pre-populates the dialog box when a device type is dragged onto the network workspace. Finally, the connection portions 34d-1 though 34d-N provides connection statements for the device type. Specifically, a connection portion 34d will be provided for port, modular slot or other type of connection interface for the device type. Each connection statement will include a physical name for the port or other type of connection interface and the network entity names for all other types of devices which may be connected to the port. For example, if the network device was a modular router having 4 PCI slots, each connectable to ethernet, X.25, frame relay, PPP and IDSN type entities, and an ethernet port connectable to an ethernet entity, the attributes section 34 could be as set forth in the following code:

```
:ATTRIBUTES
ICON ROUTER.ICO
NETENTITY "Compaq Router"
DESCRIPTION "Modular and Fast"
CONNECT "PCI SLOT 1"    "Ethernet" "X.25"    "Frame Relay"
                        "PPP" "ISDN"
CONNECT "PCI SLOT 2"    "Ethernet" "X.25"    "Frame Relay"
                        "PPP" "ISDN"
CONNECT "PCI SLOT 3"    "Ethernet" "X.25"    "Frame Relay"
                        "PPP" "ISDN"
CONNECT "PCI SLOT 4"    "Ethernet" "X.25"    "Frame Relay"
                        "PPP" "ISDN"
CONNECT "Ethernet Port" "Ethernet"
```

©1995 Compaq Computer Corporation

Figure 2C:
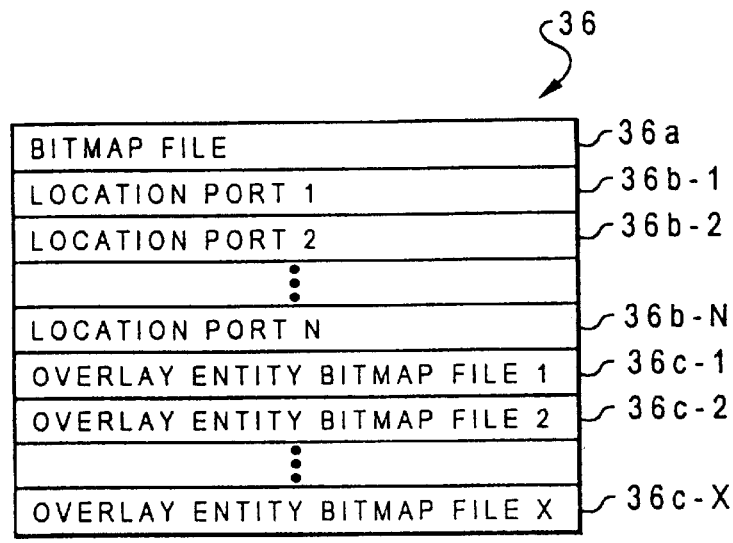
FIG. 2C is an expanded block diagram of a bitmap section of a configuration script of FIG. 2A.

Turning next to FIG. 2C, the bitmap section 36 defines the "drill down" bitmap which is presented to the network administrator upon requesting subsequent configuration of a configured network device. The bitmap section 36 also defines any necessary overlay bitmaps as well as provides the locations of "hot spots" on the bitmap. The bitmap is a graphical representation of the backplane of the configured device which provides connection information for the ports thereof. "Hot spots" on the bitmap are paths to additional information related to the connected ports for the configured network device.

Bitmap file portion 36a names a valid window bitmap format file which will be displayed in its own window when the network administrator double clicks on a configured network device. For each connected port of the configured network device, the bitmap section 36 will also include a location port portion 36b-1 through 36b-N which provides the location of the hot spot for the connected port on the bitmap. Finally, the bitmap section includes an overlay device bitmap file 36c-1 through 36c-x for each type of network device or entity which is connectable to the configured network device. Then, if the configured device is connected to that particular network entity, the network entity can be represented on the bitmap.

For example, if the bitmap 36 is comprised of a bitmap file 36a, port locations 36b-1 and 36b-2 and overlay device file 36c-1 as set forth in the sample code below:

```
BITMAP "router.bmp"
LOCATE "Slot 1" 20 40
LOCATE "Port 1" 50 90 70 120
OVERLAY "Ethernet" "TLAN.BMP"
```

©1995 Compaq Computer Corporation

The bitmap 36 will include a representation of an ethernet-type network entity stored at TLAN.BMP drawn on top of the representation of a backplane of a router stored at ROUTER.BMP at coordinates 20, 40 if the "Ethernet"-type network entity is plugged into "Slot 1".

The bitmap menu section 38 defines a menu hierarchy presented to the user for hot spots, for example, connected slots, on the bitmap and the executable commands for each item included in a command menu. The command menu is displayed when the network administrator clicks on a connected slot on the bitmap. The bitmap menu section 38 is subdivided into network entity command sections 38a-1 through 38a-x. Specifically, for each network entity for which connection to the device is allowed, a corresponding network entity command section is provided such that, if that network entity is connected to the device, the commands defined in the section will be displayed to the network administrator for selective execution thereof.

Figure 2D:
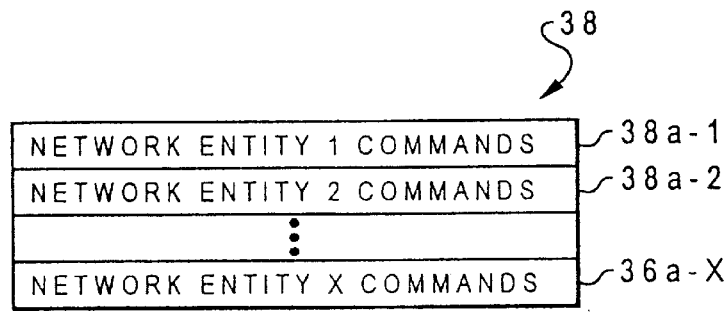
FIG. 2D is an expanded block diagram of a bitmap menu section of a configuration script of FIG. 2A.
Figure 2E:
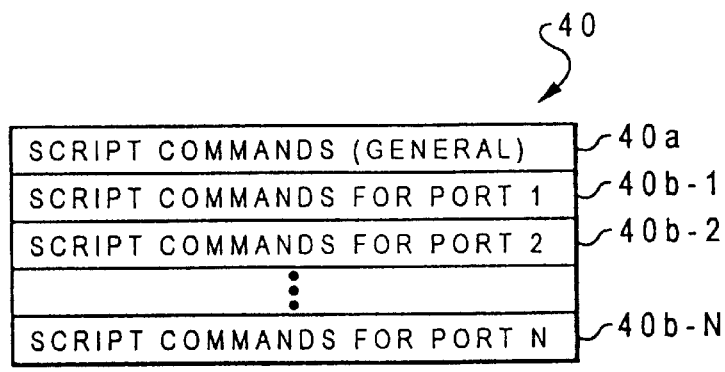
FIG. 2E is an expanded block diagram of a guided configuration section of a configuration script of FIG. 2A.

The guided configuration section 40 defines the GUIs used to guide a user through configuration of a device and controls the configuration file to be constructed using user responses to the GUIs. As illustrated in FIG. 2D, the guided configuration section 40 is subdivided into a general script command portion 40a and a port script command portion 40b-1 through 40b-N for each port to which the device is connectable. A guided configuration script for a Cisco 2514 router is set forth in Appendix A by way of example and will be described in greater detail with respect to FIGS. 3–D, below.

Returning now to FIG. 1B, the network device configuration tool 10 will now be described in greater detail. Generally, the map editor 14 controls the generation of a map of a network configuration while delegating the task of configuring unconfigured devices placed on the network configuration map to the configuration guide 18. Upon initiation of the configuration process, the map editor 14 selectively retrieves a map file 16, or creates a blank map, for editing. To add a device of a selected type to the network configuration map, the map editor 14 retrieves the corresponding configuration script 12-N from the configuration scripts 12 and, using the information contained in the retrieved configuration script 12-N, places an unconfigured device of the selected type on the network configuration map and appends a name for the device to the map. The map editor 14 performs all operations in which editing of the network configuration map is proposed. For example, if a connection between two devices placed on the network configuration map is proposed, the map editor 14 reviews the configuration scripts 12 for the devices and, if a connection between the two devices is permitted, the map editor 14 completes the proposed connection and appends the connection information to the network configuration map.

If a request to configure a device placed on the network configuration map is received, the map editor 14 transfers the name and connection information for the device to the configuration guide 18 and instructs the configuration guide 18 to perform the requested configuration task. For example, if configuration of a network device is requested, the configuration guide 18 will retrieve the configuration script 12-N for that type of network device and execute the instructions contained in the guided configuration section 40 thereof. Using the information provided by the configuration script 12, the map editor 14 and input provided by the network administrator in response to execution of the instructions contained in the guided configuration section 40, the configuration guide 18 builds a local configuration file, associated with the device, for use by the network administrator and a corresponding network configuration file suitable for upload to the network device to enable configuration of the network device.

Figure 3A:
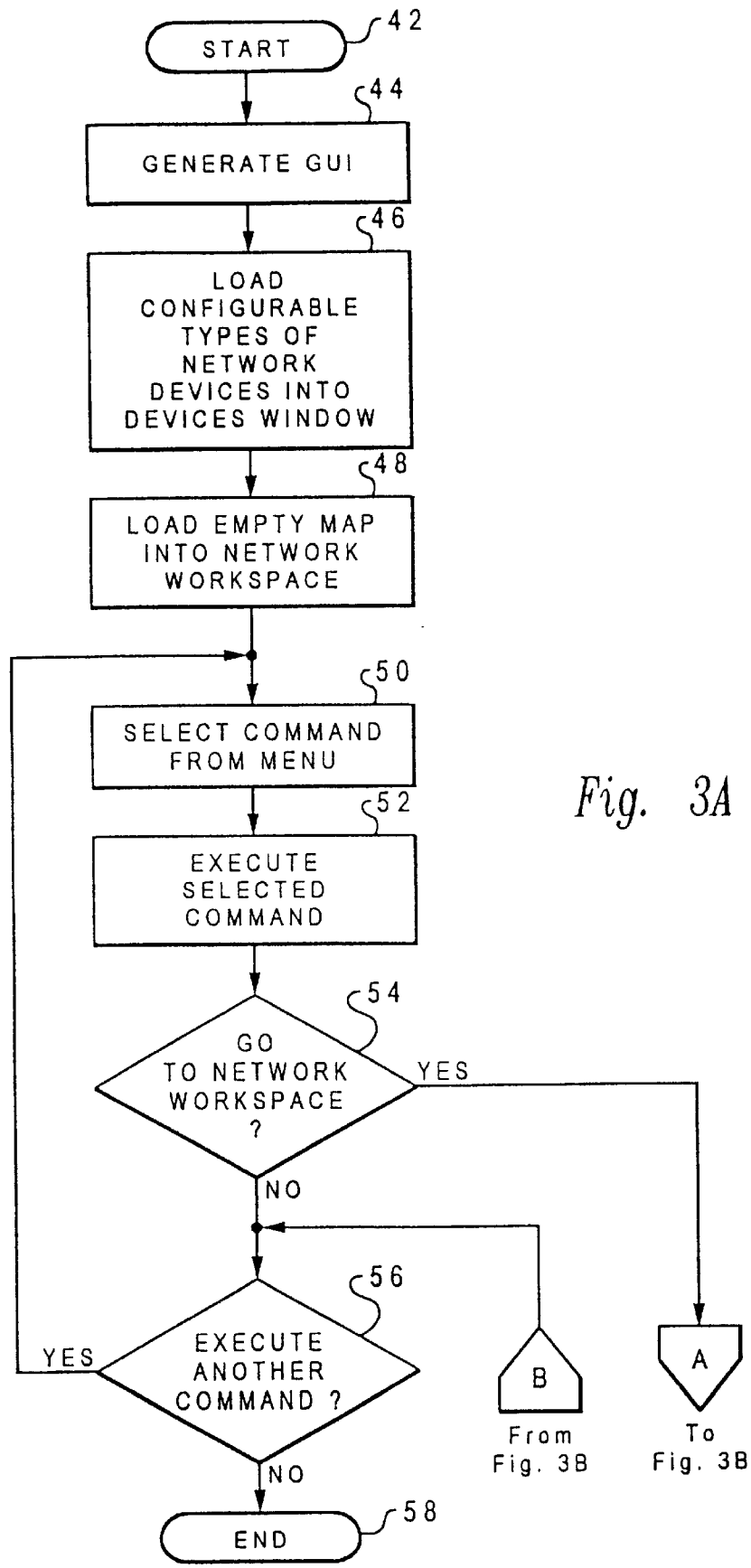
FIG. 3A is a flow chart of a method for guiding configuration of a network device in accordance with the teachings of the present invention.
Figure 3B:
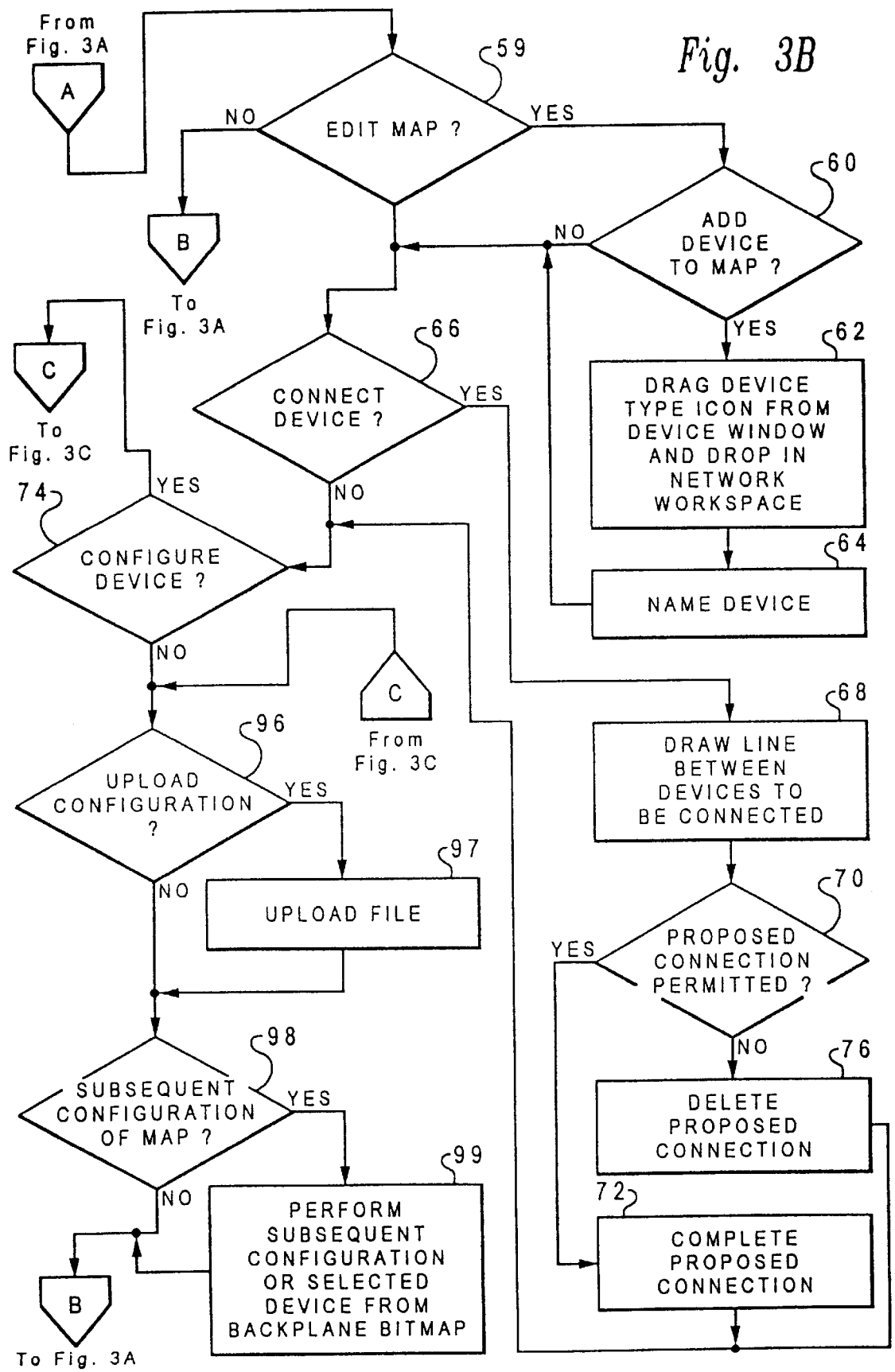
FIG. 3B is a flow chart of a map edit portion of the flow chart of FIG. 3A.
Figure 3C:
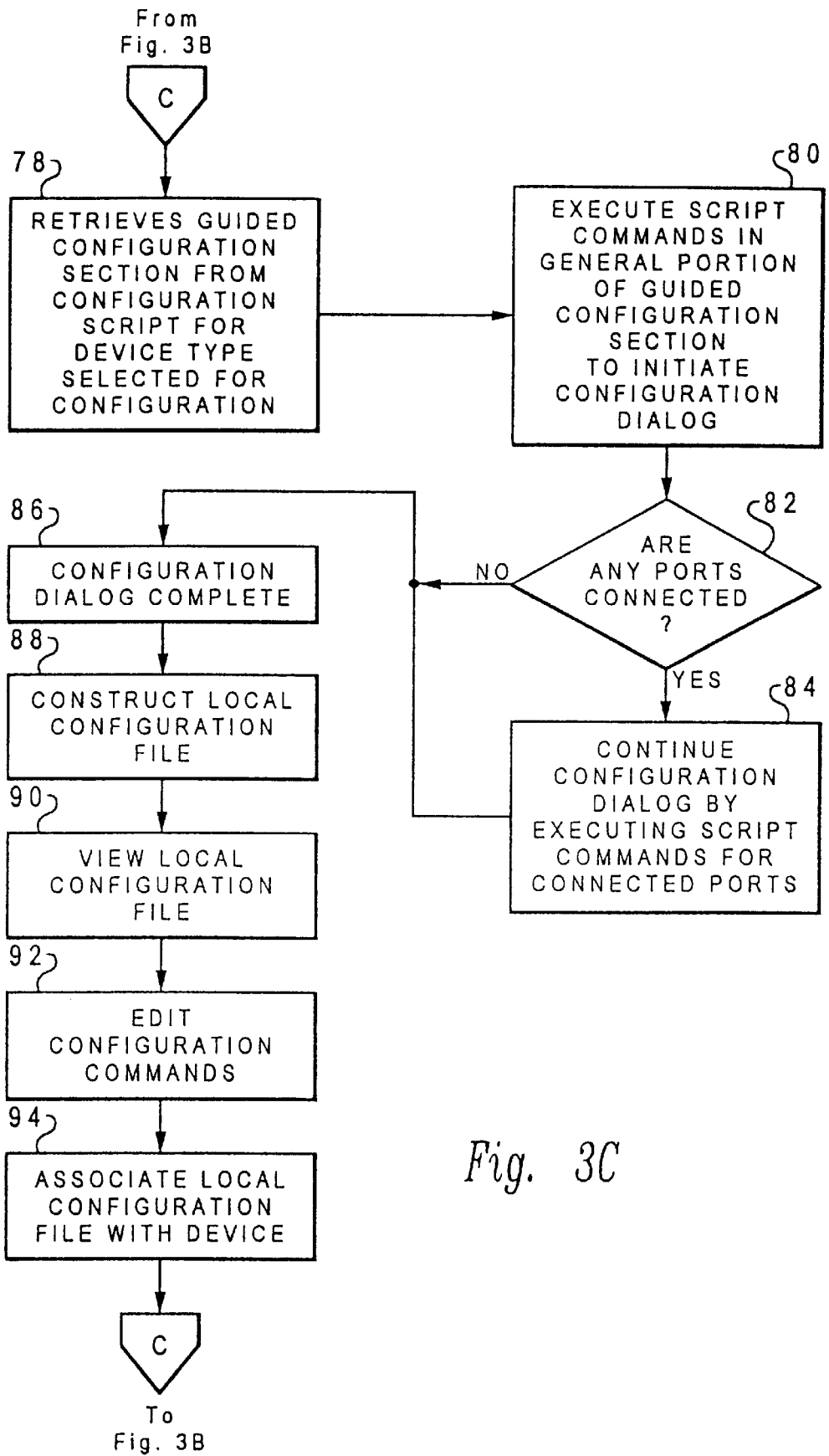
FIGS. 3C and 3D are a flow chart of a method for determining whether a pair of network devices are connectable.

Referring next to FIG. 3A, the method for guiding configuration of a network device by constructing a configuration file for the network device which is the subject of the present invention shall now be described in greater detail. It should be clearly understood, however, that the illustrated order of steps is purely exemplary and should not be construed as limiting the scope of the invention. The method commences at step 42 by launching the network device configuration tool 10 from a platform such as Windows '95 by selecting an icon previously designated as providing a path to the network device configuration tool 10.

Proceeding to step 44, once launched, the network device configuration tool 10 generates a configuration manager GUI 100 (see FIG. 4) which provides a network workspace 102 and a device window 104. In the network workspace 102, a map comprised of any number of interconnected network devices, each having a configuration tied thereto, may be produced. The device window 104, on the other hand, displays all of the types of network devices which may be placed on the network workspace 102. Continuing on to step 46, for each type of network device for which a configuration script 12-N has been prepared and stored in the memory subsystem 6, the network device configuration tool 10 places an icon representative of the network device type in the device type window 104 to indicate to the user which types of network devices are configurable by the network device configuration tool 10. For example, the device window 104 illustrated in FIG. 4 includes icons representative of a PPP link, a vendor specific modular router, an ISDN-type WAN, an Ethernet-type LAN, a non-vendor specific computer subsystem, an X.25-type packet-switching WAN, and an ISDN-type WAN which subscribes to frame relay-mode service. At step 48, the network device configuration tool 10 loads a blank map into the network workspace 102. At this stage, the network device configuration tool 10 has completed loading the configuration manager GUI 100 and is ready to execute selected commands in response to inputs received from the network administrator via the user interface 9.

Proceeding on to step 50, the network administrator selects a command, either from one of the pull-down menus listed on the pull-down menu bar 108 or by depressing a command button displayed on command button bar 110. The menus displayed on the pull-down menu bar 108 are "file", "edit", "network", "window" and "help". By selecting one of these menus, a series of commands, each of which relates to the selected menu, are displayed. Available file commands are "new", "open", "save", "save as", "print", "print setup" and "exit". The new command clears the network workspace 102 of any network configuration map placed thereon. The open command allows the network administrator to select a network configuration map to be placed on the network workspace 102. The save and save as commands stores the map placed on the network workspace 102 to the memory subsystem 6. The print command prints the network configuration map placed on network workspace 102. The print setup command displays the printer configuration for the computer system 10. The exit command closes the network configuration tool.

Commands available under the edit menu are "draw mode", "move mode", "workspace properties", "edit device", "view/configure device", "delete device", "all ports connected configuration", "update configuration", "retrieve configuration", "associate configuration", "telnet to this device". The draw mode command allows the network administrator to draw connections between devices displayed on the network workspace 102. The workspace properties command is, in fact, a second pull-down menu which allows the network administrator to tailor the map placed in the network workspace 102. Commands available under the workspace properties menu are "view entity name", "view entity description", "view entity connections", "view ip addresses", "view ipx addresses", all of which add the listed information to the display of each device on the map, and the "snap to grid" and "view grid", both of which orientate the map to a grid.

The edit device command accesses the configuration information associated with a selected network device. The view/configure command displays a view of the backplane of a selected configured network device or, if the selected network device is unconfigured, defaults to the configuration dialog set forth in greater detail below. The delete device command removes a selected network device or entity from the network workspace. The all ports configured, update configuration provides access to a selected device's configuration file. The retrieve configuration file allows the network administrator to directly access a configuration file stored in the memory subsystem 6 while the associate configuration command permits the network administrator to append a configuration file to a device. The telnet to the device command initiates an in-band transfer of configuration information from the network device configuration tool 10 to the network device 26.

Commands available under the network menu are "bootptab maintenance", "enable bootp server", "disable bootp server", "enable TFTP server", "disable TFTP server" and "view network activity log". All of these commands are relate to the exchange of configuration information between the network device configuration tool 10 and the network device 26. More specifically, the bootptab maintenance command enables the network administrator to review previously constructed bootptab files 32. The enable/disable bootp server commands control the operation of the computer system 2 on which the network device configuration tool 10 operates as a bootp server, i.e. is capable of sending and/or receiving bootp messages via the bootp/TFTP manager 30. When enabled as a bootp server, the computer system 2 listens for bootp requests placed on the network by devices requesting configuration information. The enable/disable TFTP server commands control operation of the computer system 2 on which the network device configuration tool 10 operates as a TFTP server, i.e. is capable of sending and/or receiving TFTP messages via the bootp/TFTP interface 30. Finally, the view network activity log provides a historical display of exchanges between the network device configuration tool 10 and network devices requesting configuration.

Commands under the window menu are "arrange", "configuration files" "workspace", "requesting router" and "network devices". The arrange command is a pull-down menu which provides a set of commands which modify the appearance of the configuration management GUI 100. The configuration files command displays the configuration files stored in the memory subsystem. The workspace and network device commands respectively move the network administrator to the network workspace 102 and the device window 104. Finally, the requesting router command provides a list of network devices 26 requesting IP addresses and configuration files from the network device configuration tool 10.

The command button bar 110 provides immediate execution of selected commands available from the pull-down menus 108. The commands which may be executed from the command button bar 110 are new, open, save, print, draw mode, move mode, network devices, workspace, requesting router, view network activity log and help.

Figure 4:
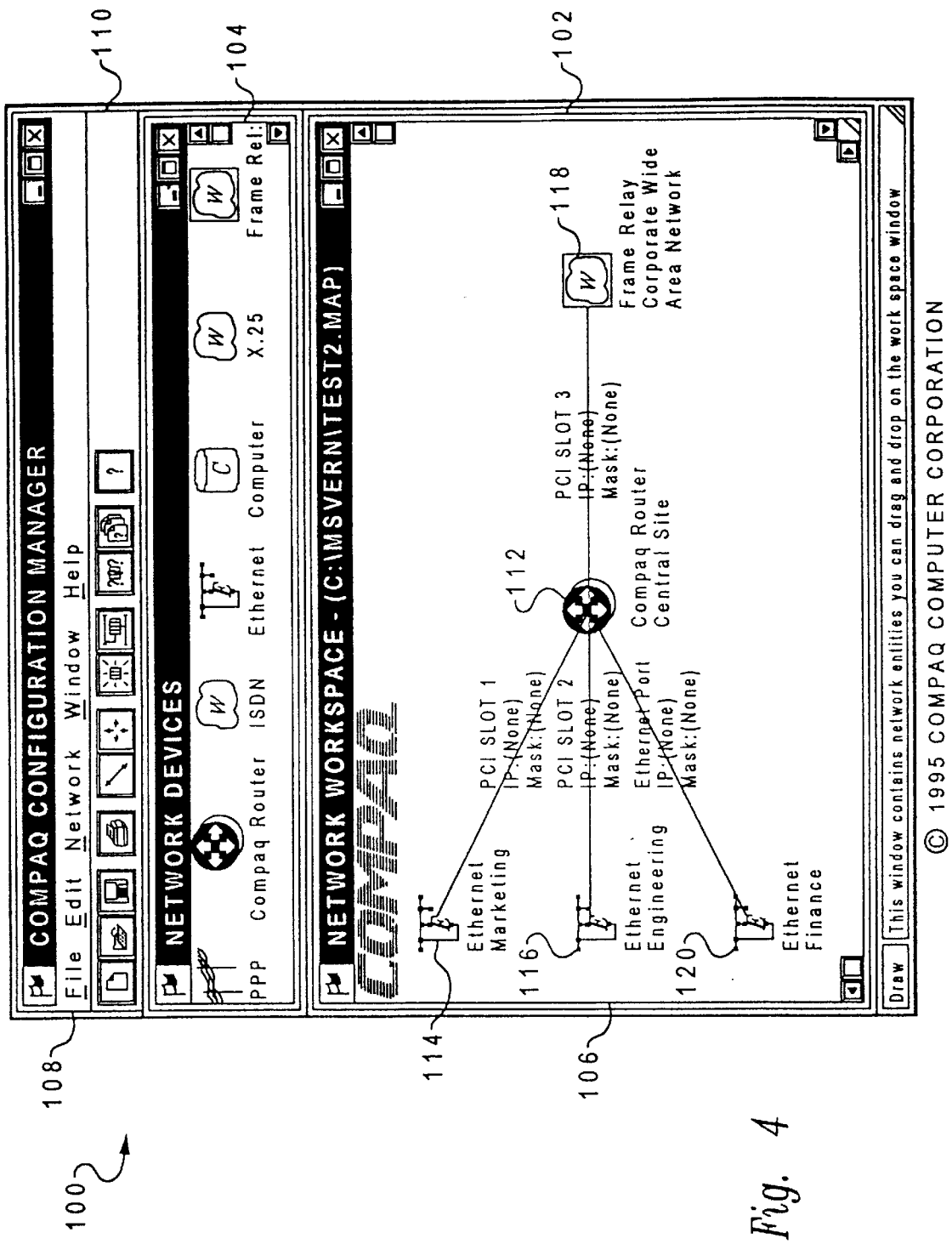
FIG. 4 illustrates a configuration manager GUI for constructing a map of configured network devices with a preconstructed network configuration map in a network workspace portion thereof.

Proceeding to step 52, the network administrator executes the command selected at step 50. For example, if the network administrator decides to retrieve an existing network configuration map stored in memory, the network administrator may click on the "open map" command button on the command button bar to display a list of map files 16 stored in memory and then select a map file to be opened. An exemplary network configuration map 106 which may be stored in memory is illustrated in FIG. 4. The network configuration map 106 is comprised of a vendor specific device 112, here, a modular router manufactured by Compaq Computer Corporation of Houston, Tex., having a first peripheral connection interface (or "PCI") slot coupled to a first ethernet-type LAN 114, a second PCI slot coupled to a second ethernet-type LAN 116, a third PCI slot coupled to a frame relay-type WAN 118 and an ethernet port coupled to a third ethernet-type LAN 120.

Continuing on to step 54, the network administrator then decides whether to edit the network configuration map 106 displayed in the network workspace 102. If the network administrator decides not to edit the network configuration map 106, the method proceeds to step 56 where the network administrator decides whether to execute another command. If so, the method returns to step 56. Otherwise, the network administrator closes the network configuration tool at step 58 to end the method.

Returning now to step 54, if the network administrator decides to go to the network workspace 102 to edit either the blank map initially loaded into the network workspace 102 at step 48 or, if a saved map was retrieved from the map files 16 by executing an "open file" command at step 52, the retrieved map loaded into the network workspace at step 52, the method proceeds to step 59 (FIG. 3B) where the network administrator decides whether to edit the map displayed in the network workspace 102. If the network administrator decides not to edit the map, the method returns to step 56 (FIG. 3A). If, however, the network administrator decides to edit the configuration network map 106 displayed in the network workspace 102 the method proceeds to step 60 where editing of the map commences.

At step 60, the network administrator may select a device type displayed in device type window 104 and add a device of the selected type to the map 106 displayed in network workspace 102. Proceeding to step 62, to add a device of a type displayed in the device type window 104 to the network configuration map 106, displayed in the network workspace 102, the user selects an icon representing a desired device type and, using the "drag and drop" process, places the icon on the network configuration map 106 displayed in the network workspace 102. For example, using a mouse or other conventional pointing device, the user would point to an icon representing the desired device type, select the device type by holding a leftmost button on the mouse in the depressed position, point to the desired position on the map and release the button. By doing so, a new device of the selected type is added to the network map. For example, in FIG. 7, a single network device, i.e., a modular router 122 manufacture by Compaq Computer Corporation, and a pair of network entities, i.e., ethernet type LANs 124 and 126 have been added to the network configuration map 106.

Each network device and/or network entity added to the network configuration map 106 is associated with a corresponding one of the configuration scripts 12-N. Accordingly, at step 64, the map editor 14 displays the name of the network device or entity contained in the attributes section 34 of the corresponding configuration script 12-N as the name of the newly added network device or entity. For example, the name of the network device 122 added to the network configuration map 106 is "Compaq Router".

Upon placing the, as yet unconnected, network device 122 and entities 124, 126 on the network configuration map 106, or if it was decided at step 60 to not add a network device or entity to the network configuration map 106, the method proceeds to step 66 where the network administrator decides whether to connect the newly added network devices and entities 122, 124 and 126 to other network devices or entities. For example, the network administrator may decide to connect the Compaq router 122 to the frame relay-type WAN 118, the ethernet-type LAN 124 and the ethernet-type LAN 126. If the network administrator decides to connect the Compaq router 122 to the ethernet-type LAN 124, the method proceeds to step 68 where the network administrator would select the Compaq router 122 by holding a leftmost button on the mouse in the depressed position while pointing to the Compaq router 122, draw a connection between the Compaq router 122 and the ethernet-type LAN 124 by repositioning the mouse to point at the ethernet-type LAN 124 while the button is depressed and releasing the button to complete the connection.

Figure 7:
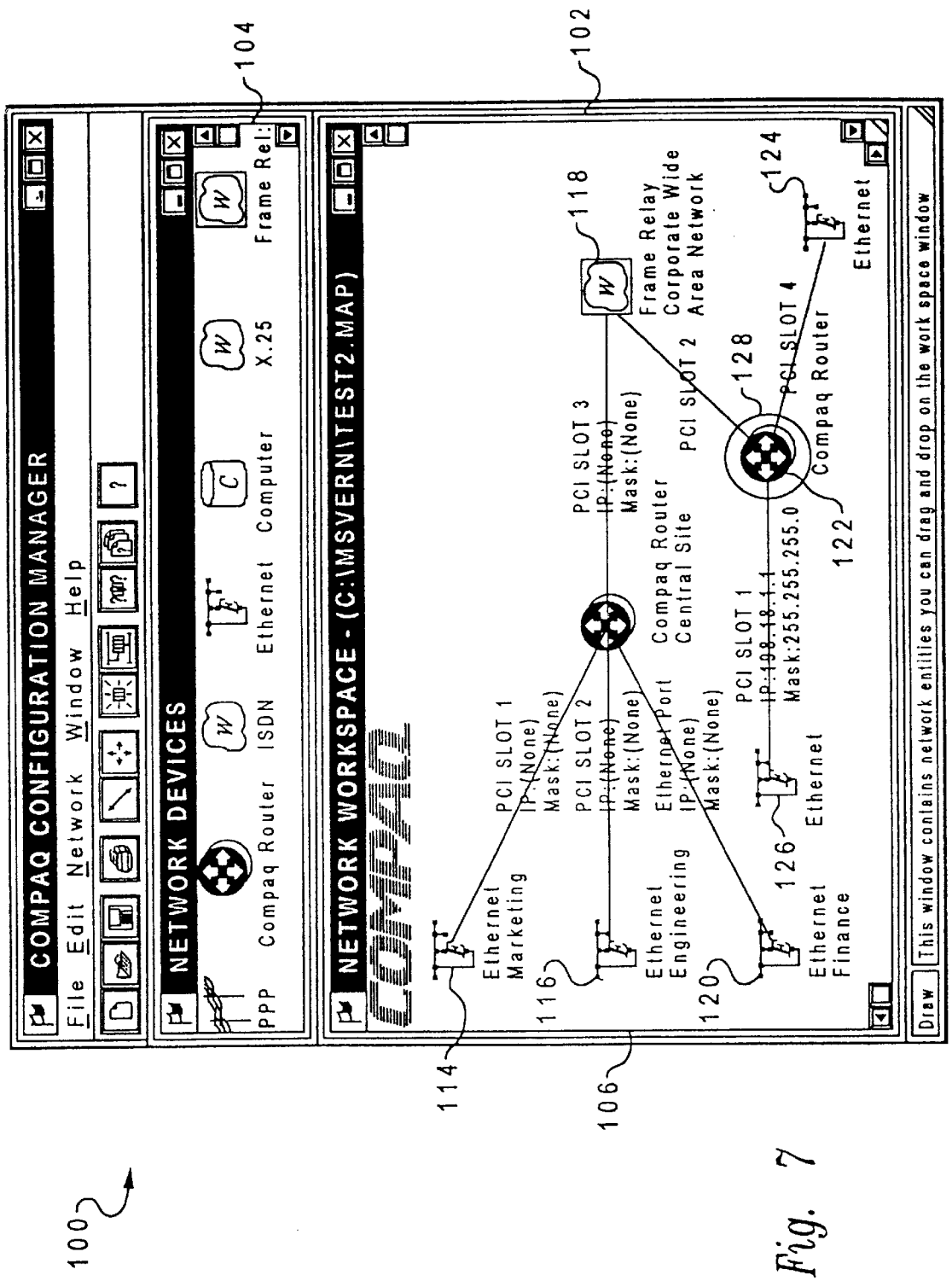
FIG. 7 illustrates the configuration manager GUI of FIG. 4 with the preconstructed network configuration map modified to include newly added and configured devices therein.

Continuing on to step 70, the map editor 14 determines whether the proposed connection is permissible. If the proposed connection is permitted, the line drawn by the network administrator is completed at step 72. The connection interface(s) for the origination device are then placed on the network configuration map 106 and the method continues on to step 74 for further editing of the network configuration map 106. For example, as shown in FIG. 7, PCI slot 1 of the Compaq router 122 has been used to connect the device to the ethernet-type LAN 126, PCI slot 2 to connect to the frame relay-type WAN 118 and PCI slot 4 to connect to the ethernet-type LAN 124. If, however, the proposed connection is not permitted, the line drawn by the user is deleted at step 76 before continuing on to step 74.

Returning to step 70, the method by which the map editor 14 determines whether the proposed connection is permitted will now be described in greater detail. An initial determination as to whether the proposed connection is permissible is made based upon the contents of the attributes section 34 of the configuration scripts 12-N for the devices placed on the map 106. For example, the configuration script for a Cisco 2514 router is set forth in the attached appendix. A portion of the attributes section of the configuration script contains the following code:

| CONNECT | "ETHERNET0" | "Ethernet" |
| CONNECT | "ETHERNET1" | "Ethernet" |
| CONNECT | "SERIAL0" | "X.25" "Frame Relay" "PPP" "HDLC" |
| CONNECT | "SERIAL1" | "X.25" "Frame Relay" "PPP" "HDLC" |

©1995 Compaq Computer Corporation

This portion of the configuration script code contains considerable connection information for the device. Specifically, the device has four connection interfaces—two ethernet ports and two serial ports. Furthermore, the two ethernet ports are only connectable to an ethernet-type LAN entities device while the two serial ports are connectable only to X.25, frame relay, PPP and HDLC entities. Accordingly, at step 70, the mapper compares the list of network device or entity types which are connectable for the two devices and/or entities for which connection is proposed. If the devices and/or entities are connectable, the method proceeds to step 72 where connection of the two devices and/or continues.

Figure 3D:
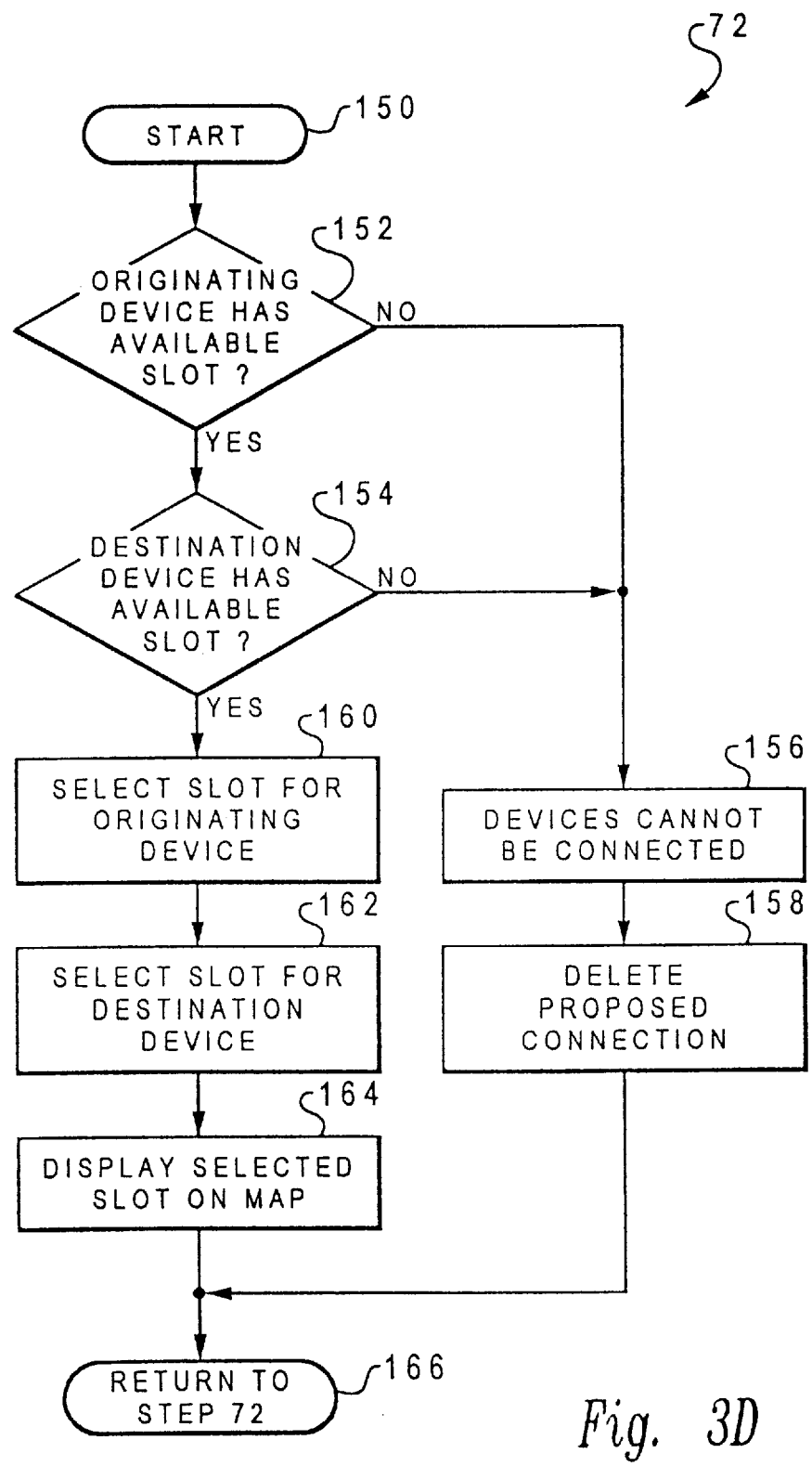

Turning momentarily to FIG. 3D, the step of connecting the two devices and/or entities will now be described in greater detail. The method commences at step 150 and continues on to step 152 where the configuration file for the origination device or entity is reviewed to determine if the origination device or entity has an available slot which is connectable to the destination device or entity and to step 154 where the configuration file for the destination device or entity is reviewed to determine if the destination device or entity has an available slot which is connectable to the origination device or entity. If either the origination or destination device or entity do not have an available slot which is connectable to the other device or entity, a determination is made at step 156 that the devices/entities cannot be connected. The proposed connection is then deleted at step 158 and, continuing on to step 166, the method returns to step 72.

Returning to step 154, if it is determined that both the origination and destination devices or entities have available slots, the method proceeds to step 160 where a connection interface is selected for the originating device and on to step 162 where a connection interface is selected for the destination device or entity. At both of these steps, the network administrator may select any one of a list of available connection interfaces overlayed on the network configuration map 106 by the network device configuration tool 10. If only one connection interface is available for a device or entity, however, the map will automatically select the available interface and indicate its selection of the connection interface to the network administrator. Upon selecting connection interfaces for the devices or entities, the method proceeds to step 164 where the selected connection interface for the device 122 is displayed on the network configuration map 106 and on to step 166 for a return to step 72.

Upon either a decision not to connect devices or entities at step 66, a completion of a proposed connection at step 72 or a deletion of a proposed connection at step 76, the method proceeds to step 74 where the network administrator decides whether to configure a device. To initiate configuration of a selected unconfigured device, the network administrator double clicks on the device to be configured. At step 78 (FIG. 3C) the configuration guide 18 retrieves the guided configuration section 40 from the configuration script 12-N for the type of device to be configured and, proceeding to step 80, executes the script commands contained in the general script commands portion 40a of the guided configuration section 40. In turn, the execution of the script commands causes a series of questions to be asked of the network administrator, the answers to which are used to construct a configuration file. For example, if the script commands set forth in the guided configuration section of the configuration script set forth in Appendix A were executed during configuration of a Cisco 2514 router, the network administrator would be asked to name the router, indicate whether to configure internet protocol (or "IP") for the router, indicate which IP routing protocol should be used for the router, whether to configure IPX for the router, indicate whether the router should be password protected, choose a password for the router, indicate whether the configuration mode for the router should be password protected and choose a password for the configuration mode.

Proceeding to step 82, the configuration guide 18 determines whether any ports of the device being configured are connected to a second device or entity. If any of the ports are connected, the method proceeds to step 84 where the configuration guide 18 executes the script commands for the connected ports. For example, if serial port 1 of a Cisco router 2514 was connected to a WAN, the configuration guide 18 would execute the script commands set forth in seriall portion of the script commands set forth in Appendix A. Thus, in this example, the network administrator would be asked whether the serial port should be configured, the IP address and mask for the port, the IPX network number, whether the port should be configured for frame relay, the type of connector being used for the port, the local data link connection identifier (or "DLCI"), the Committed Information Rate (or "CIR") and the Excess Information Rate (or "EIR") for the port and whether to use compression.

Figure 5:
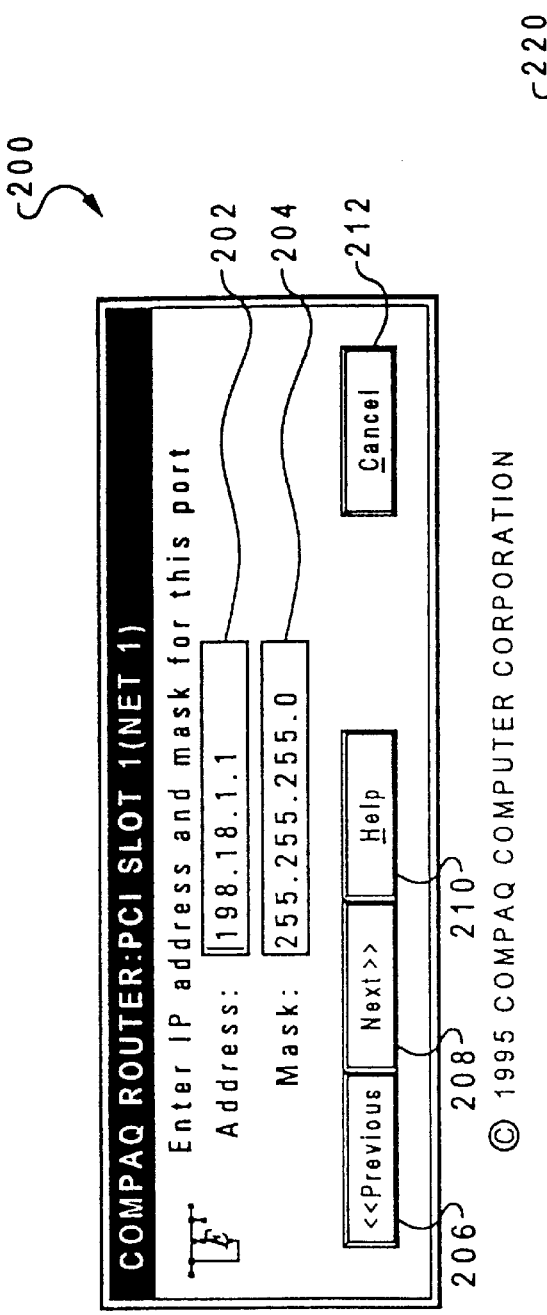
FIG. 5 illustrates an exemplary guided configuration GUI for constructing a configuration script for a network device.

The configuration guide 18 collects the information necessary to configure the device by engaging the network administrator in a dialog during which the configuration guide 18 generates a series of GUIs, each of which displays a request for information and provides areas in which the requested information may be inputted and buttons for guiding the network administrator through the dialogue. By way of example, an IP address GUI 200 is illustrated in FIG. 5. The network administrator may input the IP address and mask for the indicated slot and device by respectively entering the IP address and mask in areas 202 and 204. The network administrator may also review a prior GUI in the dialogue by depressing button 206, proceed to the next GUI in the dialogue by depressing button 208, request help by depressing button 210 or exit the configuration dialog by depressing button 212.

Upon successful execution of the script commands for the connected ports at step 84, or if it was determined at step 82 that no ports are connected for the device being configured, the configuration dialog is completed at step 86 and, at step 88, the information provided by the network administrator during the dialogue is used to construct a local configuration file 20 for the device. If desired, the network administrator may view the local configuration file 20 constructed during this process at step 90, directly edit any of the configuration commands contained therein at step 92 before saving the constructed local configuration file 20 to the memory subsystem and associating it with the device. Selected portions of the configuration information contained in the local configuration file 20 may be displayed on the network configuration map 106. For example, FIG. 7 displays the IP address and mask for PCI slot 1 of the Compaq router 122 which was input by the network administrator during configuration of the device. The network configuration map 106 may also include a indicator 128, for example, a loop surrounding a device, which indicates that a device has been configured.

Having successfully constructed a local configuration file 20 and associated it with the device being configured, the method proceeds to step 96 (FIG. 3B) where the network administrator decides whether to upload the configuration file to the device. If upload is selected, the method proceeds to step 97 where the constructed configuration file is uploaded to the network device 26. Various mechanisms may be used to upload a constructed configuration file to the network device 26. For example, in many circumstances, an in-band transfer of the configuration file via telnet may be used. In other circumstances, other mechanisms more fully described below may be necessary to transfer configuration information to the network device 26.

While constructing a local configuration file for a device, the network device configuration tool 10 also constructs a bootptab file for the device. The bootptab file is particularly useful in those situations where the network administrator decides not to upload the configuration file upon completing the construction thereof, for example, if the network device is unconnected, powered down or otherwise unavailable. A bootptab file for a device contains the serial number for the device to be configured, an IP address to assign to the device to be configured and the configuration file to be uploaded to the device. As will be more fully described with respect to FIGS. 8–9, below, the bootptab file provides information necessary for unattended remote configuration of network devices as they are connected to the network.

Returning now to FIG. 3B, after completing upload of the configuration file at step 97, or if the network administrator decided at step 96 not to upload the configuration file, the method proceeds to step 98 where the network administrator decides whether to perform subsequent configuration on a device on the network configuration map 106. If subsequent configuration of a device is selected, the method proceeds to step 99 where subsequent configuration of a selected device is performed from a backplane bitmap of the selected device. To select a device for subsequent configuration, the network administrator double clicks on a configured device included on the network configuration map 106. By doing so, a bitmap of the backplane of the selected configured device is displayed.

Figure 6:
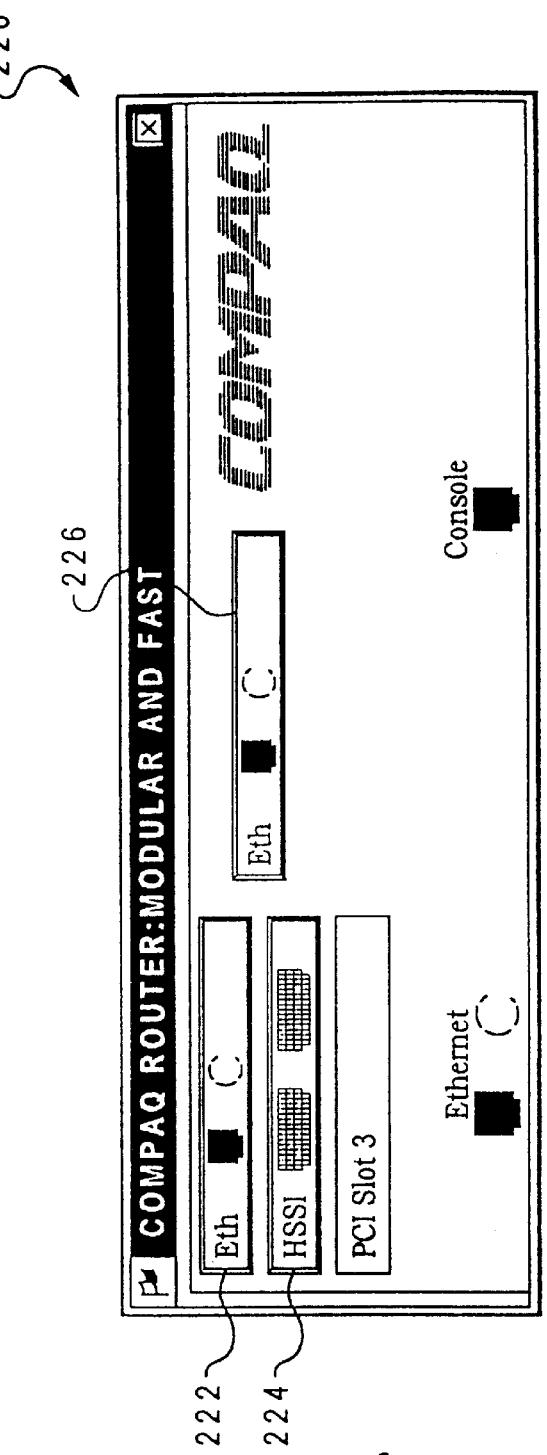
FIG. 6 illustrates a backplane bitmap for a configured network device.

FIG. 6 illustrates a backplane bitmap 220 for the Compaq router 122 of FIG. 7. As may now be seen, the various connection interfaces used to connect the router 122 to network entities, as well as unconnected connection interfaces, are graphically displayed on the backplane bitmap 220 using the information contained in the bitmap section 36 of the configuration script 12-N and the local configuration file 20 for the Compaq router 122. Specifically, for the Compaq router 122, PCI slot 1 has been used to provide a first ethernet connection 222, PCI slot 2, an HSSI connection 224 and PCI slot 4, a second ethernet 226. PCI slot 3, however, remains unconnected. From the backplane bitmap 220, the network administrator may view the settings for a port by double clicking on a selected port or, by depressing the right mouse button, bring up a pull down menu of commands contained in the network entity commands section 38a–x of the bitmap menu 38 for the network entity connected to the selected port and select any of the configuration commands listed on the pull down menu for execution.

After completing subsequent configuration of the device at step 99, or if the network administrator decided at step 98 not to perform subsequent configuration, the method returns to step 56 (FIG. 3A).

Figure 8:
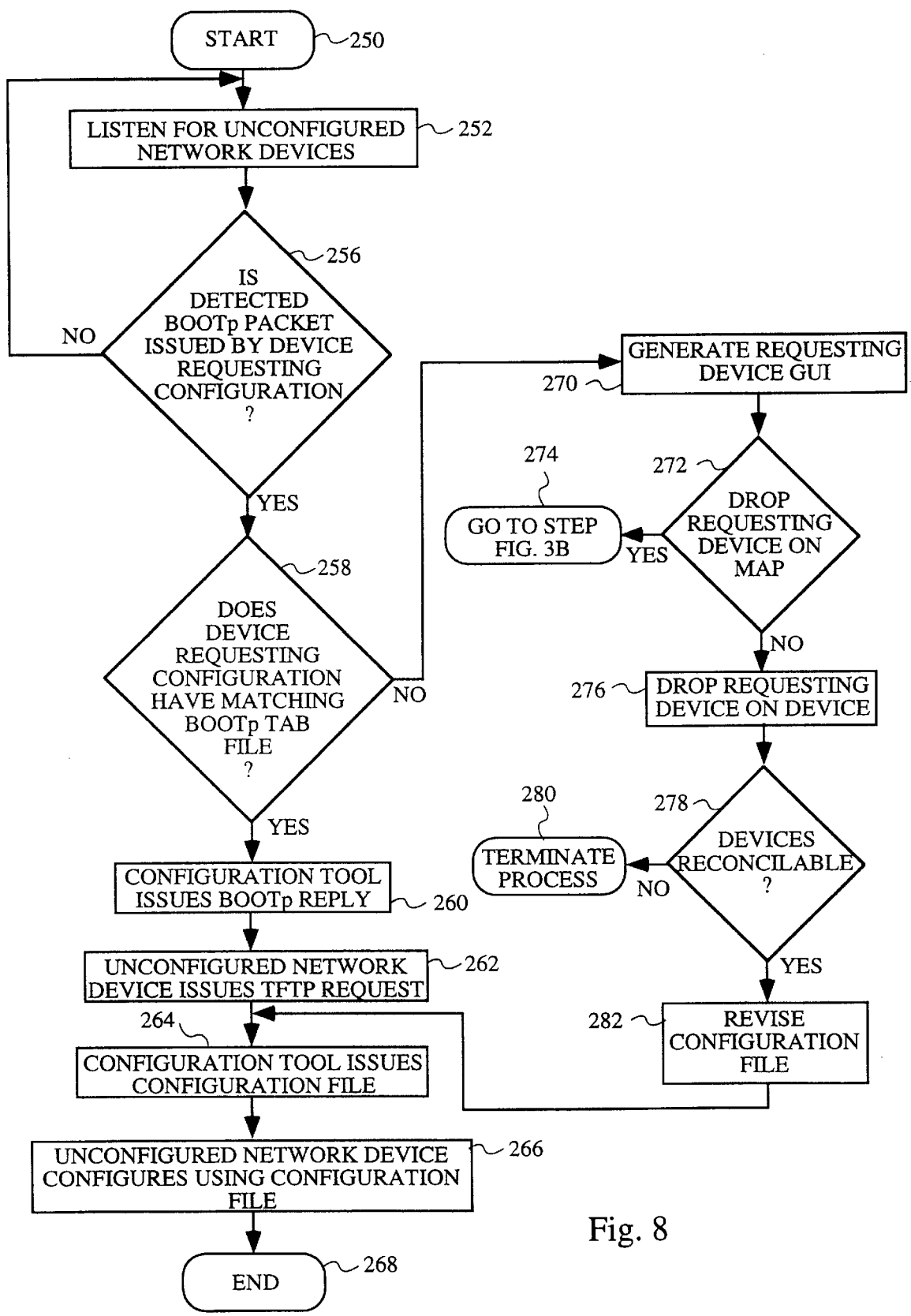
FIG. 8 is a flowchart of a method of configuring a remote network device in accordance with another aspect of the present invention.

Turning next to FIG. 8, a method of transmitting configuration information to a network device 26 in accordance with the teachings of the present invention shall now be described in greater detail. The method commences at step 250 by launching the network device configuration tool 10. As previously stated with respect to FIG. 3A, launch of the network device configuration tool 10 initiates the generation of the configuration manager GUI 100. In addition, launch of the network device configuration tool 10 initiates listening, by the network device configuration tool 10 at step 252, for the presence of unconfigured network devices 26 on the network.

Proceeding to step 254, the network device configuration tool 10 will detect bootp packets transmitted on the network and determine if the bootp packet was issued by a device requesting configuration information from the network device configuration tool 10. More specifically, if an unconfigured network device 26 powers up on the network, the unconfigured network device 26 will periodically issue a bootp packet which contains a medium access code (or "MAC") address for the device and a code which indicates that the device is requesting configuration information. For example, the code may be placed in the vendor specific field of the bootp packet. If a detected bootp packet does not contain a request for configuration information, the method returns to step 252 where the configuration tool continues to listen for bootp packets.

If, however, the network device configuration tool 10 determines at step 256 that the issuing device is requesting configuration information, for example, by matching a request code held by the network device configuration tool 10 with a corresponding code contained in the detected bootp packet, the method proceeds to step 258 where the network device configuration tool 10 will determine if the device requesting configuration information has a corresponding bootptab file 32 and if the description of the device requesting configuration information matches the device drawn on the network configuration map 106.

In order to determine whether the device requesting configuration information has a corresponding bootptab file 32 and if the description of the device matches the device drawn on the network configuration map, the attributes section 34 must be modified to include two additional portions—bootpid and subdeviceid. The bootpid portion contains a number unique to a particular device type and model number. The subdeviceid identifies the type of devices installed in the device. For example, if the network device was a modular router having 4 PCI slots, each connectable to ethernet, X.25, frame relay, PPP and IDSN type entities, and an ethernet port connectable to an ethernet entity with a ThunderLan board connectable to ethernet entities, a W-Adapter connectable to X.25, frame relay and PPP entities and a Basic Rate ISDN Board connectable to ISDN entities installed therein, the attributes section 34 could be as set forth in the following code:

:ATTRIBUTES
ICON ROUTER.ICO
NETENTITY "Compaq Router"
DESCRIPTION "Modular and Fast"

| CONNECT "PCI SLOT 1" | "Ethernet" "X.25" "PPP" "ISDN" | "Frame Relay" |
|---|---|---|
| CONNECT "PCI SLOT 2" | "Ethernet" "X.25" "PPP" "ISDN" | "Frame Relay" |
| CONNECT "PCI SLOT 3" | "Ethernet" "X.25" "PPP" "ISDN" | "Frame Relay" |
| CONNECT "PCI SLOT 4" | "Ethernet" "X.25" "PPP" "ISDN" | "Frame Relay" |
| CONNECT "Ethernet Port" | "Ethernet" | | bootpid 103
subdeviceid 11 "ThunderLan board" "Ethernet"
subdeviceid 12 "W-Adapter" "X.25" *2 "Frame Relay" *2 "PPP" *2
subdeviceid 13 "Basic Rate ISDN Board" "ISDN"
©1995 Compaq Computer Corporation The guided configuration section would be similarly modified to include an additional command script portion which, upon execution thereof, will issue any additional requests for information, for example, installed devices, necessary to construct the bootptab file described herein such that a determination as to whether the description of the device requesting configuration matches the device drawn on the network configuration map 106.

Proceeding to step 260, if the device requesting configuration has a matching bootptab file, i.e., the bootptab file has a bootpid which matches the serial number of a device having a bootptab file and if the devices installed in the device requesting configuration match the devices identified in the subdeviceid portion of the configuration file for the matching bootptab file, the network device configuration tool 10 issues a bootp reply at step 260. The bootp reply contains the filename which matches the configuration file described in the matching bootptab file. Using the filename contained in the bootp reply, at step 262, the device requesting configuration may issue a TFTP request for configuration information to the network device configuration tool 10 which identifies the configuration file containing its configuration information.

Continuing on to step 264, in response to the TFTP request containing the filename of a configuration file issued by the device requesting configuration, the network device configuration tool 10 responds by issuing the requested configuration file to the device. At step 266, the unconfigured network device configures itself using the information contained in the configuration file transmitted thereto by the network device configuration tool 10 and, at step 268, the method ends.

Figure 9:
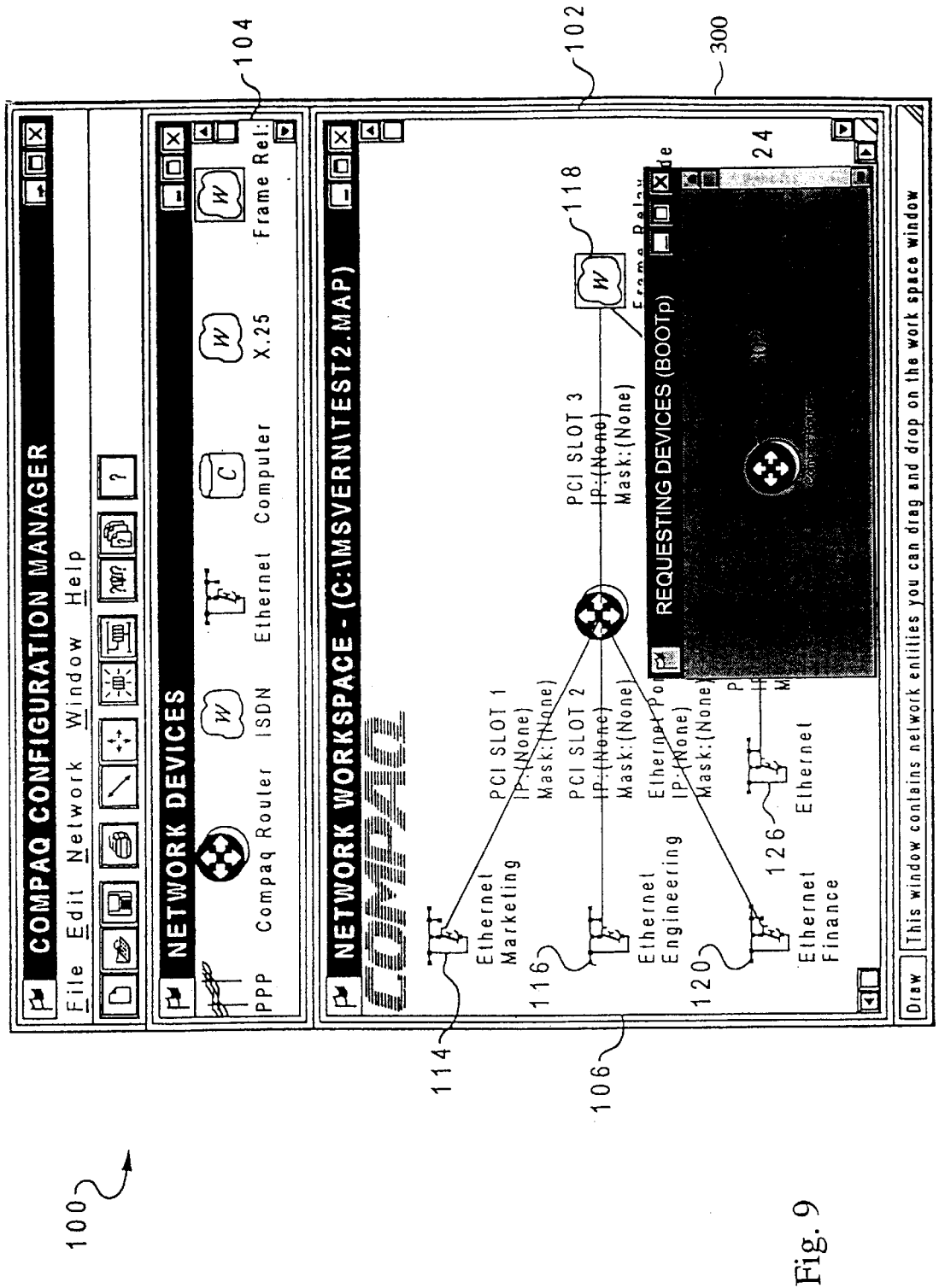
FIG. 9 illustrates a pop-up bootP GUI in which an unconfigured network device is requesting configuration information.

Returning to step 258, if the device requesting configuration does not have a matching bootptab file, the method proceeds to step 270 where the network device configuration tool 10 generates a pop-up requesting device GUI 300 which overlays a portion of the configuration manager GUI 100. A requesting device GUI 300 is illustrated in FIG. 9. As illustrated herein, the requesting device GUI 300 includes an icon representing the unconfigured network device 302 requesting configuration.

Proceeding to step 272, the network administrator may select one of two options to configure the device requesting configuration. If the network administrator decides that the device 302 is a new device, the requesting device may be dropped onto the network workspace 102, thereby adding the requesting device to the network configuration map 106 as an unconnected device. Proceeding on to step 274, the method would return to step 64 (FIG. 3B) wherein the previously discussed process of constructing a configuration file and uploading the configuration file to the unconfigured network device may be completed to configure the device requesting configuration.

Returning to step 272 and, now proceeding to step 276, the network administrator may instead opt to drop the device 302 requesting configuration onto an existing device, for example, router 112, already included on the network configuration map 106. By dropping the device 302 requesting configuration onto an existing device on the network configuration map 106, the network administrator is indicating that the device 302 requesting configuration is the same device that is already on the network configuration map 106 but, due to a difference between the description of the device 302 in the bootptab and the description of the device 112 contained in the corresponding configuration file, the network device configuration tool 10 is unable to recognize that the two are the same device.

Proceeding on to step 278, the network device configuration tool 10 would reconcile the configuration file and the bootptab file for the device. If the two are irreconcilable, the method terminates at step 280. If the two can be reconciled, the configuration file is revised appropriately at step 282 and the method then returns to step 264 so that the network device configuration tool 10 may issue the revised configuration file to the device 302 requesting configuration in the manner previously described. To reconcile the device 302 requesting configuration and an existing device such as the router 112, the network device configuration tool 10 reviews the devices installed on the device requesting configuration match the devices installed. If the installed devices match, then the configuration file is modified using the contents of the bootptab file. The method then proceeds to step 264 so that the network device configuration tool 10 may issue the revised configuration file to the device 302 requesting configuration.

Thus, there has been described and illustrated herein an apparatus and associated method for constructing a configuration file for a network device suitable for upload to the network device to enable the configurement thereof. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

-A-1-   Patent Application
        Docket # CMPQ-0985
        P-985

APPENDIX "A"

File: 2514.DEV

:ATTRIBUTES
ICON ROUTER.ICO
NETENTITY "Cisco 2514"
DESCRIPTION "Cisco IOS"

CONNECT "ETHERNET0" "Ethernet"
CONNECT "ETHERNET1" "Ethernet"
CONNECT "SERIAL0"   "X.25" "Frame Relay" "PPP"   "HDLC"
CONNECT "SERIAL1"   "X.25" "Frame Relay" "PPP"   "HDLC"

:GUIDED_CONFIG

```
    use 2514vars.use
    frame
    askstring routername "What do you want to name this
router?" minlen 2 maxlen 20
    savefilename $routername "-confg"
    addconfig "hostname   " $routername frame
    radio configip "Do you want to configure IP on this
router?" "Yes" "No"
    if $configip = "Yes" then
                    frame
                       radio routeprot "What IP routing
protocol do you want to use?"
"RIP"  "IGRP"
                       addconfig " !"
                       addconfig " ! IP routing protocol to
use"
                       addconfig " !"
                       addconfig "router    " $routeprot
                       addconfig " !"
    endif frame
    radio configipx "Do you want to configure IPX on
this router?" "Yes" "No"
    if $configipix = "Yes" then
                       addconfig " !"
                       addconfig " ! Enable IPX routing"
                       addconfig " !"
```

```
                              -A-2-        Patent Application
                                           Docket # CMPQ-0985
                                           P-985
                    addconfig "ipx routing"
                    addconfig " !"
                    frame
                    radio yesno "Do you want password
protect configuration mode?"
"Yes" "No"
                    if $yesno = "Yes" then
                              askpass enablepassword
"Enter password for
configuration mode" minlen 5 maxlen 20
                              addconfig " !"
                              addconfig  "enable
password " $password
                              addconfig " !"
                    endif endif
        frame
        addconfig " !"
        addconfig "no ip domain-lookup"
        addconfig " !"

;ETHERNET0 frame
        assign portname "Ethernet0"
        use 2514eth.use

;ETHERNET1 frame
        assign portname "Ethernet1"
        use 2514eth.use

;SERIAL0 frame
        assign portname "SERIAL0"
        use 2514wan.use

;SERIAL1 frame
        assign portname "SERIAL1"
        use 2514wan.use
```

-A-3-          Patent Application
                                             Docket # CMPQ-0985
                                             P-985

;BITMAP
bitmap          2514.bmp locate          "ETHERNET0"     56    69    87    79
locate          "ETHERNET1"     110   69    141   79
locate          "SERIAL0"       250   64    302   82
locate          "SERIAL1"       326   64    377   82

:BITMAP_MENU

;Ethernet menu "Something"
    menuitem "Pick me"
        define string 80
        askstring string "Enter something"

addconfig "you entered " $string
menuend

;Serial0 menu "No items available yet"

;PROMPTS
"Password;"
"-More-"

File: 2514vars.use variables to use with the Cisco 2514 config scripts
(2514*.*)
define configip         3
define configipx        3
define routeprot        4
define password         30
define enablepassword   30
define ipaddress        15
define ipmask           15
define ipxaddress       20
define ipxencap         15
define lpsz             80
define portname         10
define yesno            3
define frconnector      10

-A-4-        Patent Application
                                                     Docket # CMPQ-0985
                                                     P-985 define frdici         3
define frcir          4
define freir          4
define frportspeed    4
define pppmtu         5
define pppauth        4
define pppcompress    10
define ppplapb        3
define ppptacacs      3
define pppconnector   5
define routername     30

File: 2514eth.use

```
    assign lpsz "Do you want to configure " $portname
"?"
    radio yesno $lpsz "Yes" "No"
    if $yesno = "Yes" then addconfig   " !"  $Sportname   "configuration
commands"
            addconfig " !"
            addconfig "interface " $portname
            addconfig " !"

if $configip = "Yes" then frame
                    getip ipaddress ipmask
                    askip ipaddress ipmask "Enter IP network
that interface is plugged
 into"

addconfig " !"
                    addconfig " ! IP related commands"
                    addconfig " !"
                    addconfig "ip address " $ipaddress " "
$ipmask
                    addconfig " !"
                    assignip $ipaddress $ipmask endif if $configipx = "Yes" then
```

-A-5-  Patent Application
Docket # CMPQ-0985
P-985

```
            frame
            getipx ipxaddress
            askstring ipxaddress "Enter IPX network
number for this interface"
hex maxlen 8
            frame
                radio  ipxencap  "What  type  of  IPX
ethernet encapsulation should be
used?"  "ARPA" "Novell-Ether"  "SAP"  "SNAP"
            addconfig " !"
            addconfig " ! IPX related commands"
            addconfig " !"
             addconfig "ipx network " $ipxaddress
            addconfig "ipx encap " $ipxencap
            addconfig " !"
            assignipx $ipxaddress endif
    endif File: 2514wan.use
    assign lpsz "Do you want to configure " $portname
"?"
    radio yesno $lpsz "Yes" "No"

if $yesno = "Yes" then addconfig " !"
        addconfig " ! " $portname " configuration
commands"
        addconfig "interface " $portname
        addconfig " !"

if $configip = "Yes" then frame
        assign lpsz "Enter IP address for " $portname
        askip ipaddress ipmask $lpsz
        addconfig "!"
        addconfig "! IP related commands"
        addconfig "!"
        addconfig "ip address " $ipaddress " " $ipmask
    endif if $configipx = "Yes" then
        frame
```

-A-6-   Patent Application
Docket # CMPQ-0985
P-985

```
        assign lpsz "Enter IPX network number for "
$portname
        askstring ipxaddress $lpsz hex maxlen 8
        addconfig " !"
        addconfig " ! IPX related commands"
        addconfig " !"
        addconfig "novell address " $ipxaddress
        addconfig " !"
    endif if $connected = "Frame Relay" then frame
        assign lpsz "Would you like to configure Frame
Relay for "
$portname "?"
        assign yesno "Yes"
        radio yesno $lpsz "Yes" "No"
        if $yesno - "Yes" then addconfig " !"
            radio yesno $lpsz "Yes" "No"
            if $yesno = "Yes" then addconfig " !"
                addconfig " ! Set Encapsulation to
Frame Relay"
                addconfig "encapsulation frame-relay"

#               radio  frconnector  "What  connector
type are you using?" "RS-232" "V.35"
                askstring frdlci "What is your local
DLCI" MIN 16 MAX 996
                # set DLCI command
                assign  lpsz  "What  is  " $portname
"Physical Port Line Speed (Kbps)"
                askstring frportspeed $lpsz MIN 1.2
MAX 2048
                # set port speed command
                assign lpsz "What is the Committed
Information Rate (CIR)
for " $portname "?"
                askstring  frcir  $lpsz  MIN 1.2 MAX
2048
                # set CIR command
```

-A-7-     Patent Application
          Docket # CMPQ-0985
          P-985

```
                assign lpsz "What is the Excess
Information Rate (EIR) for *
$portname "?"
                askstring freir $lpsz MIN 1.2 MAX
2048
                # formula goes here
                # set EIR command
                radio yesno "Do you want to use
compression?" "Yes" "No"
                # if goes here
                # set compression command
#OTHER PARAMETERS to set (some under advanced button)
#frportspeed
#frcir
#frier
#frremname
#frconnrtr
#frcompress
#frnettype
#frmaxframe
#frcongmonper
#frmeasint
#frlit
#frpvt
#frfsef
#fret
#frcet
#frclocking
#fremulate
#fremulate
#frlinestate
#map
                display "<more frame relay questions
would normally follow>"
                endif
        else
        if $connected = "PPP" then frame
                assign lpsz "Would you like to configure
PPP for " $portname "?"
                assign yesno "Yes"
                radio yesno $lpsz "Yes" "No"
                if $yesno = "Yes" then

# Set defaults
```

```
                              -A-8-          Patent Application
                                             Docket # CMPQ-0985
                                             P-985 assign ppmtu "1500"
                    assign pppauth "CHAP"
                    assign pppcompress "Stacker"
                    assign ppplapb "No"
                    assign ppptacacs "No"

addconfig " !"
                    addconfig " ! Set Encapsulation to
PPP"
                    addconfig "encapsulation ppp"

#              radio pppconnector "What connector type
are you using?"  "RS-232"
"V.35"
                    frame
                    radio pppauth "What authentication
protocol are you using?"
"PAP"  "CHAP"  "Off"
                         if $pppauth <> "Off" then
                              addconfig " !"
                              addconfig " ! PPP Authorization
related
commands"
                              addconfig " !"
                              addconfig   "no     ppp
authentication"
                         endif
                    endif frame
                    radio pppcompress "What compression method
are you using?"
"Predictor" "Stacker" "Off"
                         if $pppcompress <> "Off" then
                              addconfig " !"
                              addconfig " ! PPP Compression related
commands"
                              addconfig " !"
                              addconfig    "ppp    compress    "
$pppcompress
                         else
                              if $pppcompress = "Off" then
                                   addconfig " !"
                                   addconfig " ! PPP Compression
related commands"
```

-A-9- Patent Application
Docket # CMPQ-0985
P-985

```
                    addconfig " !"
                    addconfig "no ppp compression"
            endif
        endif frame
            radio ppplapb "Use LAPB with PPP for reliable link?" "Yes" "No"
            if $ppplapb = "Yes" then
                    addconfig " !"
                    addconfig " ! PPP LAPB with PPP for reliable link related commands"
                    addconfig " !"
                    addconfig "ppp reliable-link"
            else
                    addconfig " !"
                    addconfig " ! PPP LAPB with PPP for reliable link
related commands"
                    addconfig " !"
                    addconfig "no ppp reliable-link"
            endif
        frame radio ppptacacs "Use TACACS to verify PPP authentication?" "Yes" "No"
            if $ppptacacs = "Yes" then
                    addconfig " !
                    addconfig " ! Use TACACS to verify PPP authentication
                    addconfig "ppp use-tacacs"
            else
                    addconfig " !"
                    addconfig " ! Use TACACS to verify PPP authentication"
                    addconfig " !"
                    addconfig "no ppp use-tacacs"
            endif frame
            assign lpsz "What is the Maximum Transmission Unit for " $portname "?"
```

-A-10- Patent Application
Docket # CMPQ-0985
P-985

```
                askstring pppmtu $lpsz MIN 64 MAX 4096
                addconfig " !
                addconfig    "    !   Set   Maximum Transmission Unit"
                addconfig "mtu " $pppmtu
                addconfig "ip mtu " $pppmtu
            endif else display $portname " is connected to a " $connected " network"
            display "appropriate guided configuration commands would appear here"
        endif
    endif
```

©1995 Compaq Computer Corporation

What is claimed is:

1. For a computer system having a processor subsystem and a memory subsystem coupled by a system bus for bi-directional exchanges therebetween, an apparatus for constructing a configuration file for a network device, comprising:

at least one configuration script stored in said memory subsystem, said configuration script being executed to construct a configuration file for a first specified type of network device, said configuration script includes a first section containing a series of configuration commands which generate requests for information; and a second section containing a set of connection rules for connecting said first specified type of network device to at least one other specified type of network device, for each connection interface, said connection rules are selected from a plurality of connection rules corresponding to each network device; and a software module, executable by said processor subsystem, for constructing a configuration file suitable for upload to a network device of said first specified type by executing said configuration script, wherein information received by said software module in response to said requests for information is used to construct said configuration files, and wherein said network device is configurable using said configuration file constructed by said software module.

2. An apparatus for constructing a configuration file for a network device according to claim 1 and wherein said first section of said configuration script further comprises:

a first portion corresponding to each of said at least one other specified type of network device specified in said connection rules contained in said second section of said configuration script;

said first portion containing a subset of said series of configuration commands which are executed only if said network device for which said configuration file is being constructed is connected to a network device of said other specified type of network device.

3. An apparatus for constructing a configuration file for a network device according to claim 2 and wherein said configuration script further comprises:

a third section which defines a backplane bitmap for said network device.

4. An apparatus for constructing a configuration file for a network device according to claim 3 and wherein said third section of said configuration script further comprises:

a first portion which defines a bitmap file for generating said backplane bitmap;

a second portion which provides locations, on said backplane bitmap, of connected interfaces; and a third portion which defines at least one overlay bitmap for said backplane bitmap;

wherein said third portion includes an overlay bitmap for each of said at least one other specified type of network device specified in said connection rules contained in said second section of said configuration script.

5. An apparatus for constructing a configuration file for a network device according to claim 4 wherein said configuration script further comprises:

a fourth section which contains a user selectable set of commands for each of said connected interfaces.

6. An apparatus for constructing a configuration file for a network device according to claim 1, wherein said second section of said configuration script comprises:

an identifier for each connection interface of said first specified type of network device; and a list of network device types that can be connected to the connection interface associated therewith, said list being provided for each of said identifiers.

7. For a computer system having a system bus and a processor subsystem, a memory subsystem and a user interface respectively coupled to said system bus for bi-directional exchanges therebetween, an apparatus for constructing a network configuration map comprised of at least two interconnected network entities selected from a series of network entities, said apparatus comprising:

a series of configuration scripts stored in said memory subsystem, each one of said series of configuration scripts corresponding to one of said series of network entities, and each one of said series of configuration scripts including a first section comprised of first and second portions;

said first portion of each one of said series of configuration scripts containing an icon file for generating an icon representative of said corresponding one of said series of network entities; and said second portion of each one of said series of configuration scripts containing a set of connection rules for said corresponding one of said series of network entities, for each connection, said connection rules are selected from a plurality of connection rules corresponding to each network entity; and a first software module, executable by said processor subsystem, for constructing a network configuration map by generating a workspace, placing at least two icons on said workspace in response to a first input received from said user interface and connecting first and second ones of said at least two icons placed on said workspace in response to a second input received from said user interface if said set of connection rules contained in said second portion of said first section of said configuration scripts corresponding to first and second network entities represented by said first and second icons permit connection of said first and second network entities.

8. An apparatus for constructing a network configuration map according to claim 7 wherein at least one of said series of configuration scripts further comprises:

a second section;

said second section of said at least one of said series of configuration scripts including a series of executable instructions for constructing a configuration file for said network entity;

said apparatus further comprising:

a second software module, executable by said processor subsystem in response to a third user input selecting an icon placed on said map for configuration, for constructing a configuration file if said configuration script corresponding to said selected icon is one of said at least one configuration script having said second section by executing said series of instructions contained in said second section of said configuration script and appending said constructed configuration file to said selected icon.

9. An apparatus for constructing a network configuration map according to claim 8 and wherein said series of instructions contained in each one of said at least one configuration scripts having said second section further comprises:

a series of configuration commands which generate requests for information;

wherein information received by said second software module in response to said requests for information is used to construct said configuration file.

10. An apparatus for constructing a network configuration map according to claim 9 wherein said second section of each one of said at least one configuration scripts having said second section further comprises:

a first portion corresponding to each one of said series of network entities specified in said set of connection rules contained in said first portion of said first section of said configuration script;

said first portion of said second section containing a subset of said series of configuration commands which are executed only if said network entity for which said configuration file is being constructed is connected to a network entity specified in said set of connection rules contained in said first portion of said first section of said configuration script.

11. An apparatus for constructing a network configuration map according to claim 10 wherein said first section of each one of said series of configuration scripts further comprises:

a third portion which contains a name for said corresponding one of said series of network entities;

said first software module placing said name on said map if said icon corresponding to said configuration script is placed on said map.

12. A method for constructing a configuration file for a network device, said configuration file suitable for upload to said network device to enable configuration thereof, said method comprising the steps of:

providing a configuration script containing a series of executable instructions for constructing a configuration file for a first specified type of network device, said configuration script including a first section having a series of configuration commands and a second section containing a set of configuration rules for connecting said first specified type of network device to at least one other specified type of network device, for each connection interface, said connection rules are selected from a plurality of connection rules corresponding to each network device;

generating request for information by executing said series of configuration commands contained in said first section of said configuration script; and constructing said configuration file using at least information received in response to said request for information generated by executing said series of configuration commands contained in said first section of said configuration script.

13. A method for constructing a configuration file for a network device according to claim 12 wherein the step of providing a configuration script containing a series of executable instructions further comprises the step of:

providing a configuration script which includes a first portion corresponding to each of said at least one other specified type of network device specified in said connection rules contained in said second section of said configuration script;

each said first portion containing a subset of said series of configuration commands.

14. A method for constructing a configuration file for a network device according to claim 13 and further comprising the step of:

executing said subset of said series of configuration commands contained in each said first portion only if said network device for which said configuration file is being constructed is connected to a network device of said other specified type of network device.

15. A method for constructing a configuration file for a network device according to claim 12, wherein said second section of said configuration script comprises:

an identifier for each connection interface of said first specified type of network device; and a list of network device types that can be connected to the connection interface associated therewith, said list being provided for each of said identifiers.

16. A method for constructing a network configuration map comprised of at least two interconnected network entities selected from a series of network entities, comprising the steps of:

providing a series of configuration scripts, each of which corresponds to one of said series of network entities and includes a first section comprised of first and second portions;

said first portion of each one of said series of configuration scripts containing an icon file for generating an icon representative of said corresponding one of said series of network entities; and said second portion of each one of said series of configuration scripts containing a set of connection rules for said corresponding one of said series of network entities, for each connection, said connection rules are selected from a plurality of connection rules corresponding to each network entity;

generating a first icon representative of a first one of said network entities;

generating a second icon representative of a second one of said network entities; and connecting said first and second icons if said set of connection rules contained in said second portion of said first section of said configuration scripts corresponding to first and second network entities represented by said first and second icons permit connection of said first and second network entities.

17. A method for constructing a network configuration map according to claim 16 wherein the step of providing a series of configuration scripts further comprises the step of:

providing at least one configuration script which includes a second section having a series of executable instructions for constructing a configuration file for said network entity.

18. A method for constructing a network configuration map according to claim 17 and further comprising the step of:

selecting an icon placed on said map for configuration;

constructing a configuration file for said network device represented by said icon if said configuration script for said network device represented by said selected icon is said configuration script having said second section;

executing said series of instructions contained in said second section of said configuration script for said network device represented by said selected icon; and appending said constructed configuration file to said selected icon.

19. For a computer system having a processor subsystem and a memory subsystem coupled by a system bus for bi-directional exchanges therebetween, an apparatus for constructing a configuration file for a network device, comprising:

a plurality of configuration scripts for various different types of network devices, said configuration scripts being stored in said memory subsystem, and each of the configuration scripts including at least one configuration script stored in said memory subsystem, said configuration script being executed to construct a configuration file for a first specified type of network device, said configuration script includes a first section containing a series of configuration commands which generate requests for information; and a second section containing a set of connection rules for connecting said first specified type of network device to at least one other specified type of network device, for each connection interface, said connection rules are selected from a plurality of connection rules corresponding to each network device; and first computer program code for enabling selection of a particular one of the various different types of network devices; and second computer program code for executing the one of said configuration scripts associated with the particular one of the various different types of network devices to produce a configuration file for the particular one of the various different type of network devices.

20. An apparatus for constructing a configuration files for network devices according to claim 19, wherein each of the configuration scripts further includes a series of commands, and wherein the series of commands associated with a particular one of said configuration scripts are executed by said second computer program when said second computer program code executes the particular one of said configuration scripts.

21. An apparatus for constructing a configuration files for network devices according to claim 20, wherein dialog screens for the user to input information are produced when said second computer program code executes the one of said configuration scripts associated with the particular one of the various different types of network devices, and wherein said second computer program code prompts the user to enter the input information, and used the input information that the user enters in producing the configuration file.

22. An apparatus for constructing a configuration files for network devices according to claim 19, wherein said apparatus further comprises:

third computer program code for uploading the configuration file to a network device of the particular one of the various different types of network devices.

23. An apparatus for constructing a configuration files for network devices according to claim 19, wherein the executing of the one of said configuration scripts by said second computer program code prompts a user of said apparatus to enter information, and the entered information is used by said second computer program code in producing the configuration file.

24. An apparatus for constructing a configuration files for a network devices according to claim 19, wherein the connection rules includes an identifier for the associated port and a list of network devices that are permitted to connect to the associated port.

* * * * *